United States Patent
Sakamura et al.

(10) Patent No.: US 7,357,329 B2
(45) Date of Patent: Apr. 15, 2008

(54) IC CARD, TERMINAL DEVICE, AND DATA COMMUNICATION METHOD

(75) Inventors: Ken Sakamura, 9-2, Osaki 4-chome, Shinagawa-ku, Tokyo (JP) 141-0032; Noboru Koshizuka, 27-20, Nishikubo 2-chome, Musashino-shi, Tokyo (JP) 180-0013; Kensaku Mori, Yokohama (JP); Kazuhiko Ishii, Yokohama (JP); Hiroshi Aono, Yokohama (JP); Sadayuki Hongo, Yokohama (JP)

(73) Assignees: Ken Sakamura, Tokyo (JP); Noboru Koshizuka, Tokyo (JP); NTT DoCoMo, Inc., Tokyo (JP)

( * ) Notice: Subject to any disclaimer, the term of this patent is extended or adjusted under 35 U.S.C. 154(b) by 433 days.

(21) Appl. No.: 10/516,309

(22) PCT Filed: Jun. 9, 2003

(86) PCT No.: PCT/JP03/07250

§ 371 (c)(1),
(2), (4) Date: Dec. 10, 2004

(87) PCT Pub. No.: WO03/104997

PCT Pub. Date: Dec. 18, 2003

(65) Prior Publication Data

US 2006/0049243 A1 Mar. 9, 2006

(30) Foreign Application Priority Data

Jun. 10, 2002 (JP) .............................. 2002-169241
Jun. 10, 2002 (JP) .............................. 2002-169244

(51) Int. Cl.
*G06K 19/06* (2006.01)

(52) U.S. Cl. ........................ 235/492; 711/165; 709/50; 709/203; 455/556.1

(58) Field of Classification Search ................ 235/492; 711/165; 455/556.1

See application file for complete search history.

(56) References Cited

U.S. PATENT DOCUMENTS 5,434,395 A 7/1995 Storck et al.

(Continued)

FOREIGN PATENT DOCUMENTS

CN 1205818 A 1/1999

(Continued)

OTHER PUBLICATIONS

Bennet Yee, et al., "Secure Coprocessors in Electronic Commerce Applications", Proceedings of the 1st USENIX Workshop on Electronic Commerce, XP-002370929, Jul. 1995, 16 pages.

(Continued)

*Primary Examiner*—Michael G. Lee
*Assistant Examiner*—Allyson N Trail
(74) *Attorney, Agent, or Firm*—Oblon, Spivak, McClelland, Maier & Neustadt, P.C.

(57) ABSTRACT

The present invention avoids duplication and loss of digital contents by a transmitter/receiver and a malicious third party when the digital contents are transmitted on a communication platform where direct communication is performed between IC cards. A data communications method relating to the present invention includes the steps of executing a predetermined command when an IC card 1*a* receives a predetermined trigger signal; storing a state of the IC card 1*a* before transmission of first digital contents; performing an encryption process on the first digital contents based on key information associated with the first digital contents; deleting the first digital contents from a holder 18 of the IC card 1*a* when a commit instruction indicating completion of a reception process on the encrypted first digital contents is received from a destination device 1*b*: and performing a return process to the state of the IC card 1*a* when a transmission process on the first digital contents is interrupted.

12 Claims, 15 Drawing Sheets

U.S. PATENT DOCUMENTS

| | | |
|---|---|---|
| 6,119,946 A | 9/2000 | Teicher |
| 2001/0032237 A1* | 10/2001 | Miyake et al. ............... 709/203 |
| 2002/0150389 A1 | 10/2002 | Komoda |
| 2004/0088510 A1* | 5/2004 | Hori ........................... 711/165 |
| 2006/0142059 A1* | 6/2006 | Ishiguro et al. .......... 455/556.1 |
| 2006/0200417 A1* | 9/2006 | Stefik et al. ................... 705/50 |

FOREIGN PATENT DOCUMENTS

| | | |
|---|---|---|
| EP | 1 223 565 A1 | 7/2002 |
| JP | 2001-84177 | 3/2001 |
| JP | 2001-084177 | 3/2001 |
| JP | 2001-243707 | 9/2001 |
| JP | 2001-333371 | 11/2001 |
| JP | 2002-101087 | 4/2002 |
| WO | WO 97/16904 | 5/1997 |
| WO | WO 99/53451 | 10/1999 |
| WO | WO 01/16874 A1 | 3/2001 |
| WO | WO 01/89210 A1 | 11/2001 |

OTHER PUBLICATIONS

Jean Camp, et al., "Anonymous Atomic Transactions", Proceedings of the 2nd USENUX Workshop on Electronic Commerce, XP-002370926, Nov. 20, 1996, 10 pages.

"TRONWARE vol. 73", Personal Media Corp., vol. 13, No. 1, pp. 48-56 2002, no month.

* cited by examiner

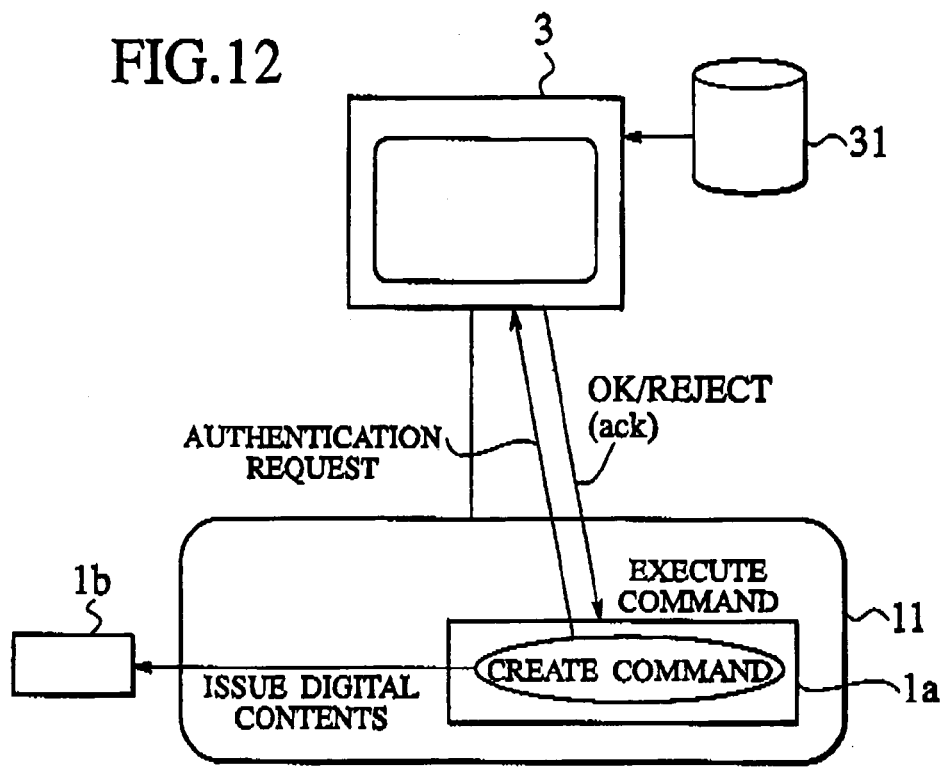
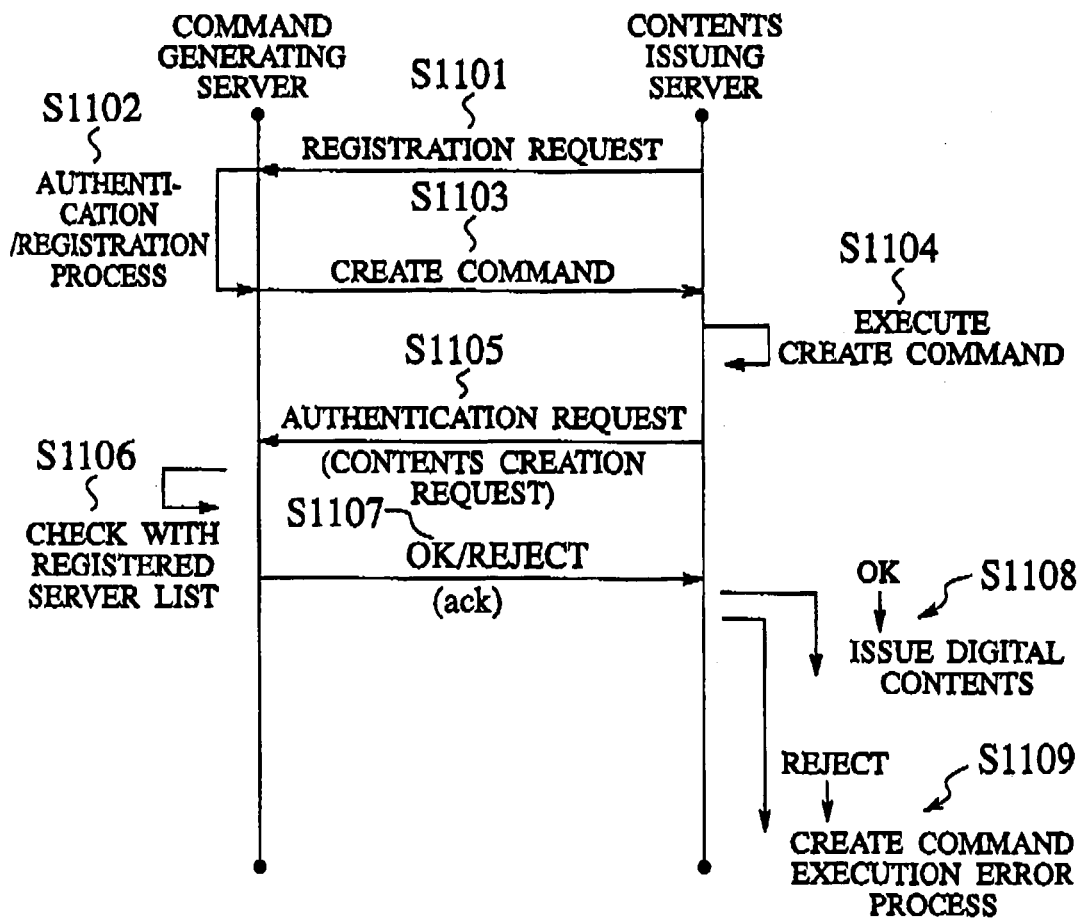

IC CARD, TERMINAL DEVICE, AND DATA COMMUNICATION METHOD

TECHNICAL FIELD

The present invention relates to an IC card usable for electronic transactions (e-commerce), contents distribution and the like, a terminal for operating the IC card, and a data communications method using the same.

BACKGROUND ART

Communication platforms have conventionally been developed on which digital contents such as electronic money are stored in an IC card, and an operating terminal (transmitting device) such as a reader/writer reads the digital contents from the IC card and transmits the read digital contents to a destination device, Other communication platforms have also been developed on which first digital contents are stored in an IC card, and an operating terminal (transmitting device) such as a reader/writer reads the first digital contents from the IC card, transmits the read first digital contents to a destination device, and receives second digital contents stored in the destination device, thereby performing an exchange of digital contents.

On the conventional communication platforms, an operating terminal (transmitting device) reads digital contents from an IC card, performs an encryption process on the digital contents, using a command of hardware or software provided at the operating terminal, and transmits the digital contents, based on the protocol of an OS run on the operating terminal, For the transmission of such digital contents, in order to ensure safe transmission of the digital contents, a system is adopted in which the digital contents are temporarily duplicated in the destination device, and then the digital contents are deleted in the operating terminal.

However, on the conventional communication platforms, digital contents stored in an IC card are processed by a command, protocol or the like of an operating terminal (transmitting device) after they are read on the operating terminal, therefore there is a possibility in that a malicious operator or a malicious third party may tamper with or fraudulently duplicate the digital contents when the digital contents are read by the operating terminal.

On the conventional communication platforms, for transmission/reception processes on digital contents between a plurality of operating terminals, a system is adopted in which a transmitting operating terminal deletes the digital contents after the digital contents are temporarily duplicated in a destination operating terminal.

Therefore, when a disconnection occurs during the transmission/reception processes on the digital contents, the digital contents under the transmission/reception processes can disappear both in the destination operating terminal and in the transmitting operating terminal.

If the transmission/reception processes on the digital contents are interrupted in the situation where the digital contents exist both in the destination operating terminal and in the transmitting operating terminal, the result is that the digital contents are duplicated in the destination operating terminal against the intention of the operator.

Especially for electronic transactions using electronic money or the like, it is required that digital contents be reliably exchanged between a transmitting operating terminal and a destination operating terminal, or when a communication failure occurs, a transmitting operating terminal and a destination operating terminal completely return to the initial state in the electronic transaction.

DISCLOSURE OF THE INVENTION

The present invention has been made in view of the above, and has an object of providing an IC card, a terminal and a data communications method which can avoid duplication and loss of digital contents by a transmitter/receiver and a malicious operator or third party when the digital contents are transmitted on a communication platform where direct communication is performed between IC cards.

Also, the present invention has an object of providing an IC card, a terminal and a data communications method which can avoid duplication and loss of digital contents by a transmitter/receiver and a malicious operator or third party when the digital contents are exchanged on a communication platform where direct communication is performed between an IC card and a terminal.

To achieve the above objects, a first aspect of the present invention is summarized as an IC card including: a holder configured to store first digital contents; a certificate data storage configured to store certificate data including key information associated with the first digital contents; an encryption processor; and an execution processor. The execution processor is configured to execute a predetermined command when receiving a predetermined trigger signal. The predetermined command executed by the execution processor causes the execution processor to store a state of the IC card before transmission of the first digital contents; causes the encryption processor to perform an encryption process on the first digital contents, based on the key information associated with the first digital contents; deletes the first digital contents from the holder when a commit instruction indicating completion of a reception process on the encrypted first digital contents is received from a destination device; and performs a return process to the state of the IC card stored in the execution processor when a transmission process on the first digital contents is interrupted.

In the first aspect of the present invention, the predetermined command executed by the execution processor preferably transmits a transmission request for second digital contents to the destination device when the commit instruction is received, and deletes the first digital contents from the holder when a reception process on the second digital contents is completed.

Also, in the first aspect of the present invention, the IC card preferably further includes an authenticator configured to obtain certificate data of the destination device from the destination device, and to authenticate the destination device based on the certificate data of the destination device, prior to transmission of the first digital contents, and the execution processor preferably executes the predetermined command when the destination device is authenticated.

Also, in the first aspect of the present invention, the authenticator is preferably configured to set an access level to the first digital contents stored in the holder, according to a session ID identifying a session with the destination device and a session mode.

Also, in the first aspect of the present invention, the authenticator is preferably configured to transmit the certificate data stored in the certificate data storage to the destination device, and to obtain from the destination device an authentication confirmation notice indicating that the certificate data has been authenticated, prior to transmission of the first digital contents, and the execution processor is preferably configured to execute the predetermined command when the authentication confirmation notice is obtained.

A second aspect of the present invention is summarized as a terminal which transmits first digital contents stored in an IC card to a destination device. The terminal includes a controller configured to output a predetermined trigger signal to the IC card, based on an input operation signal. An execution processor of the IC card is configured to execute a predetermined command in response to the predetermined trigger signal. The predetermined command executed by the execution processor causes the execution processor to store a state of the IC card before transmission of the first digital contents; causes an encryption processor of the IC card to perform an encryption process on the first digital contents, based on key information associated with the first digital contents; deletes the first digital contents from a holder of the IC card when a commit instruction indicating completion of a reception process on the encrypted first digital contents is received from the destination device; and performs a return process to the state of the IC card stored in the execution processor when a transmission process on the first digital contents is interrupted.

In the second aspect of the present invention, the predetermined command executed by the execution processor preferably transmits a transmission request for second digital contents to the destination device when the commit instruction is received, and deletes the first digital contents from the holder when a reception process on the second digital contents is completed.

Also, in the second aspect of the present invention, the terminal preferably further includes a communication monitor configured to inform the IC card of an interruption of the transmission process on the first digital contents when there is no response from the destination device during a lapse of a predetermined waiting time after transmission of the first digital contents from the IC card to the destination device.

Also, in the second aspect of the present invention, the terminal preferably further includes a display configured to read information on the first digital contents from the holder for display, based on an access level set according to a session ID identifying a session established between the IC card and the destination device and a session mode.

A third aspect of the present invention is summarized as a data communications method of transmitting first digital contents stored in an IC card to a destination device. The method includes the steps of: executing a predetermined command when the IC card receives a predetermined trigger signal; storing a state of the IC card before transmission of the first digital contents; performing an encryption process on the first digital contents, based on key information associated with the first digital contents; deleting the first digital contents from a holder of the IC card when a commit instruction indicating completion of a reception process on the encrypted first digital contents is received from the destination device; and performing a return process to the stored state of the IC card when a transmission process on the first digital contents is interrupted.

In the third aspect of the present invention, the method preferably further includes the steps of: transmitting a transmission request for second digital contents to the destination device when the commit instruction is received; and deleting the first digital contents from the holder when a reception process on the second digital contents is completed.

Also, in the third aspect of the present invention, the method preferably further includes the step of, at a terminal loaded with the IC card, outputting the predetermined trigger signal to the IC card, based on an input operation signal.

Also, in the third aspect of the present invention, the method preferably further includes the steps of: obtaining certificate data of the destination device from the destination device, prior to transmission of the first digital contents; authenticating the destination device based on the certificate data of the destination device; and, at the IC card, executing the predetermined command when the destination device is authenticated.

Also, in the third aspect of the present invention, the method preferably further includes the step of setting an access level to the first digital contents stored in the holder, according to a session ID identifying a session with the destination device and a session mode.

Also, in the third aspect of the present invention, the method preferably further includes the steps of: transmitting certificate data stored in a certificate data storage to the destination device, prior to transmission of the first digital contents; obtaining from the destination device an authentication confirmation notice indicating that the certificate data has been authenticated; and, at the IC card, executing the predetermined command when the authentication confirmation notice is obtained.

Also, in the third aspect of the present invention, the method preferably further includes the step of notifying the IC card of an interruption of the transmission process on the first digital contents when there is no response from the destination device during a lapse of a predetermined waiting time after transmission of the first digital contents from the IC card to the destination device.

Also, in the third aspect of the present invention, the method preferably further includes the step of, at the terminal, reading information on the first digital contents from the holder for display, based on the access level set according to the session ID identifying the session established between the IC card and the destination device and the session mode.

BRIEF DESCRIPTION OF DRAWINGS

FIG. 12 is a schematic block diagram of the digital contents issuing system according to the second embodiment of the present invention;

FIG. 13 is a sequence diagram illustrating the operation of the digital contents issuing system according to the second embodiment of the present invention;

BEST MODE FOR CARRYING OUT THE INVENTION

First Embodiment

A data communications method according to a first embodiment of the present invention, an IC card and a terminal suitable for use in the data communications method will be described with reference to the drawings.

Figure 1:
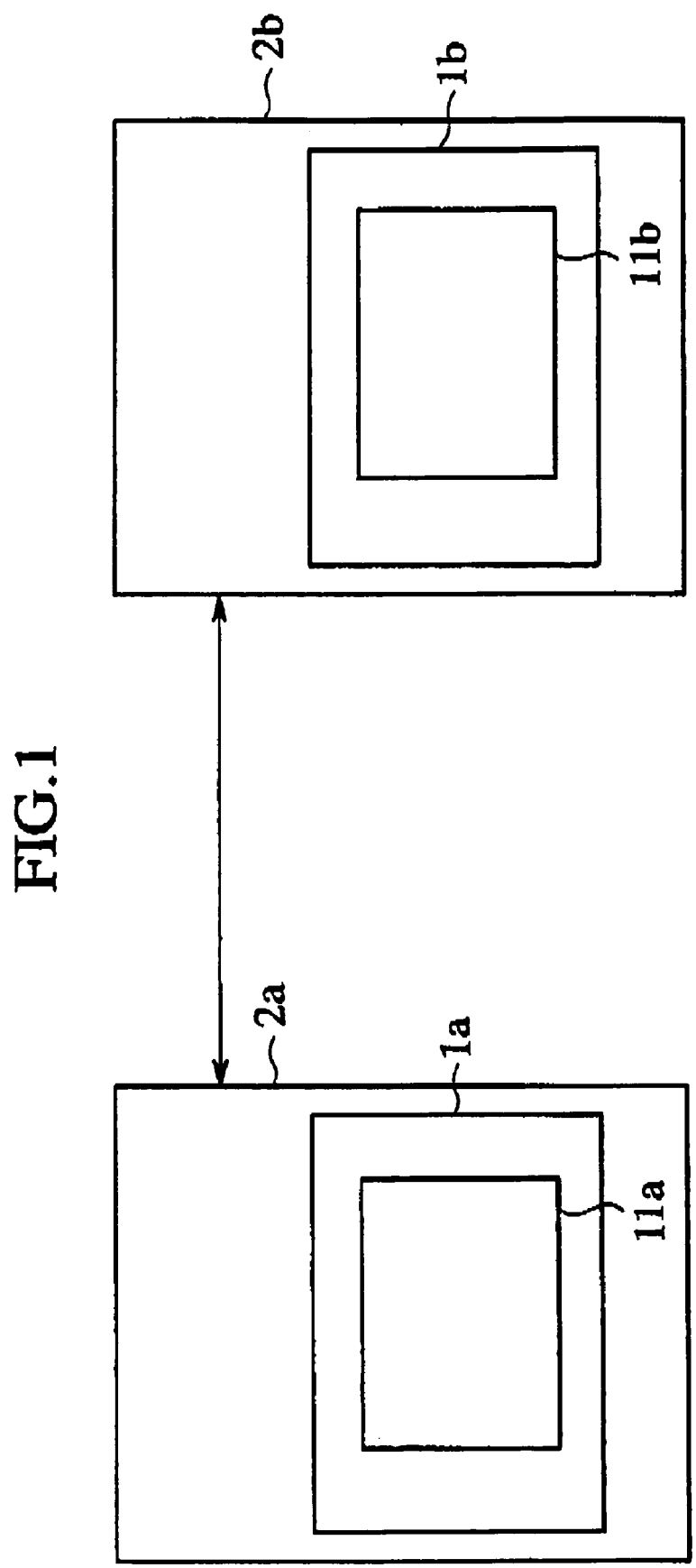
FIG. 1 is an overall block diagram of a system implementing a data communications method according to a first embodiment of the present invention.

FIG. 1 is an explanatory diagram illustrating the configuration of a system for implementing the data communications method according to this embodiment.

As shown in FIG. 1, this embodiment will be described with an example in which, on a function-distributed system, "first digital contents" stored in a first IC card 1a as a "transmitting device" are transmitted to a second IC card 1b as a "destination device", and "second digital contents" stored in the second IC card 1b are transmitted to the first IC card 1a.

As shown in FIG. 1, the first IC card 1a and the second IC card 1b are equipped with a first IC chip 11a and a second IC chip 11b, respectively. Specifically, the first IC chip 11a and the second IC chip 11b are integrated circuits fixed on the boards of the first IC card 1a and the second IC card 1b which are formed of plastic or the like.

The first IC card 1a and the second IC card 1b are loaded in a first terminal 2a and a second terminal 2b, respectively, and perform transmission/reception processes on the first and second digital contents via the terminals 2a and 2b, based on operations through the terminals 2a and 2b.

Figure 2:
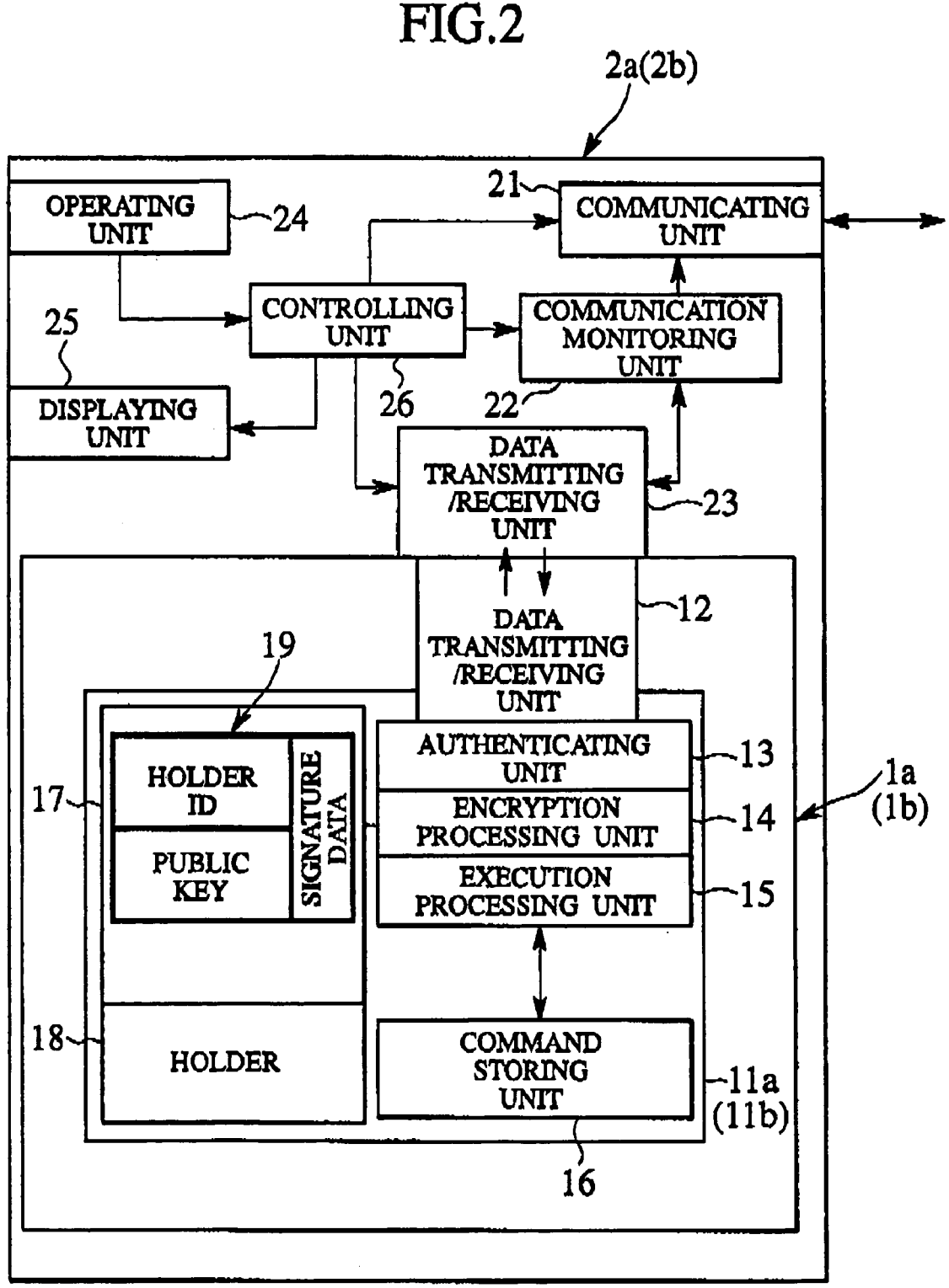
FIG. 2 is a diagram illustrating the internal structures of a terminal and an IC card according to the first embodiment of the present invention.

FIG. 2 is a block diagram illustrating the internal configurations of the first IC card 1a (or the second IC card 1b) and the first terminal 2a (or the second terminal 2b).

The internal configuration of the first IC card 1a is basically the same as the configuration of the second IC card 1b. The internal configuration of the first terminal 2a is also basically the same as the internal configuration of the second terminal 2b. Therefore, hereinafter, the internal configurations of the first IC card 1a and the first terminal 2a will be described.

As shown in FIG. 2, the first IC card 1a includes a data transmitting/receiving unit 12 configured to perform transmitting and receiving processes on data such as digital contents, certificate data, a commit instruction (described below) and a transmission request (described below), between the first IC chip 11a and the first terminal 2a.

In this embodiment, the first IC card 1a is designed not as a computer peripheral device to be operated through an operating terminal such as a reader/writer, but as a node in a distributed environment, so as to be able to have "peer-to-peer" communication with a chip of a service providing module on a network.

The first IC chip 11a is a tamperproof LSI comprised of a processor device, a memory and so on, and can be mounted on hardware other than an IC card, such as a smart card or a PDA terminal, for example.

The first IC card 1a is loaded in the first terminal 2a in an extractable manner. The first terminal 2a has a reader/writer function for performing reading and writing processes on data with the first IC card 1a, and serves as a gateway (bridge) between a communication network such as a LAN and a physical layer in contactless communication.

Specifically, the first terminal 2a may take a form such as a PDA terminal or a mobile-phone terminal, for example.

IC Card in the Embodiment

As shown in FIG. 2, the first IC card 1a according to this embodiment includes an authenticating unit 13, an encryption processing unit 14, an execution processing unit 15, a command storing unit 16, a certificate data storing unit 17, and a holder unit 18.

The authenticating unit 13 is a processing device configured to perform a mutual authentication process with another IC card (e.g., the second IC card 1b) when establishing communication with that IC card.

More specifically, prior to the transmission of the first digital contents, the authenticating unit 13 obtains certificate data of the second IC card 1b from the second IC card 1b; authenticates the second IC card 1b, based on the holder ID and signature data of the second IC card 1b contained in the obtained certificate data; transmits certificate data of the first IC card 1a to the second IC card 1b, and obtains from the second IC card 1b an "authentication confirmation notice" indicating that the certificate data of the first IC card 1a has been authenticated, so as to perform the mutual authentication process with the second IC card 1b.

Also, in this embodiment, in the mutual authentication process with the second IC card 1b, the authenticating unit 13 obtains a "session ID" identifying communication (session) established with the second IC card 1b, and a specified "session mode", and sets the access level to the digital contents stored in the holder unit 18, according to the obtained "session ID" and "session mode".

In this embodiment, the session mode is one of two modes, an "(information) issuer mode" and an "owner mode" as described below. One of the session modes is specified in the mutual authentication process between the first IC card 1a and the second IC card 1b. The session modes use different authentication algorisms.

The "(information) issuer mode" is a session mode in which an accessing party (e.g.; the second IC card 1b) is authenticated as an issuer of the digital contents An accessing party having an access level set by authentication in the "(information) issuer mode" can access digital contents created by the information issuer by the issuer's authority, and can access the other digital contents by the other authorities.

The "owner mode" is a mode in which an accessing party (e.g., the second IC card 1b) is authenticated as the owner of the first IC card 1a. In this embodiment, authentication in the "owner mode" uses a password or another easy authentication way.

An accessing party having an access level set by authentication in the "owner mode" has the owner's authority.

The encryption processing unit 14 is configured to perform an encryption process on the first digital contents stored in the holder unit 18 within the first IC card 1a. The first digital contents stored in the holder unit 18 are subjected to the encryption process by the encryption processing unit 14 before transmission to the first terminal 2a through the data transmitting/receiving unit 12.

The execution processing unit 15 is a processor configured to invoke a predetermined command from the command storing unit 16, based on a predetermined trigger signal from the outside, so as to perform the encryption process and transmission process on the first digital contents. In this embodiment, the trigger signal is provided by a controlling unit 26, based on an operation signal from an operating unit 24.

The execution processing unit 15 is configured to work with the authenticating unit 13, and executes the above-described predetermined command when the authenticating unit 13 authenticates the second IC card 1b and obtains an authentication confirmation notice from the second IC card 1b, completing the mutual authentication process with the second IC card 1b.

The command storing unit 16 is a storage device such as a memory configured to store a predetermined command.

For example, the predetermined command is a command to cause the encryption processing unit 14 to encrypt the first digital contents stored in the holder unit 18, and to cause the data transmitting/receiving unit 12 to transmit the first digital contents to the second IC card IC1b and to receive the second digital contents from the second IC card IC1b.

The certificate data storing unit 17 is a storage device such as a memory configured to store certificate data (described below) associated with the first digital contents stored in the holder unit 18. For the authentication process by the authenticating unit 13 and the encryption process by the encryption processing unit 14, the certificate data storing unit 17 provides a "holder ID", "key information" and "signature data" which are necessary data for those processes.

The holder unit 18 is a computational entity on the network configured to exchange information with another IC card (e.g., the second IC card 1b) or the like, and is a tamperproof memory device configured to store the first digital contents.

The data transmitting/receiving unit 12 is a communication device configured to transmit the encrypted first digital contents and various data such as the certificate data of the first IC card 1a to the outside by contact communication or contactless communication.

The data transmitting/receiving unit 12 in this embodiment is formed to perform transmission and reception processes on various data, being in contact with a data transmitting/receiving unit 23 of the first terminal 2a when the first IC card 1a is loaded in the first terminal 2a.

Terminal in the Embodiment

The first terminal 2a according to this embodiment can be implemented by a portable terminal such as a card reader, a mobile-phone terminal or a PDA terminal, or a general-purpose computer such as a personal computer.

As shown in FIG. 2, the first terminal 2a includes a communicating unit 21, a communication monitoring unit 22, the data transmitting/receiving unit 23, the operating unit 24, a displaying unit 25 and the controlling unit 26.

The communicating unit 21 is a communication device configured to transmit/receive various data to and from the outside (e.g., the second terminal 2b) by wireless communication or the like.

The communication monitoring unit 22 is a device configured to monitor the status of communication by the communicating unit 21. The communication monitoring unit 22 measures the elapsed time since the last transmission of data, determines that the communication has been interrupted if there is no response from a destination device during the lapse of a predetermined waiting time, and transmits this fact via the data transmitting/receiving units 23 and 12 to the execution processing unit 15 in the first IC card 1a.

The data transmitting/receiving unit 23 is provided in contact with the data transmitting/receiving unit 12 of the first IC card 1a loaded in the first terminal 2a, and performs transmission and reception processes on various data with the data transmitting/receiving unit 12.

The operating unit 24 is a button or a stick disposed at the surface of the first terminal 2a, for example, constituting an operating device operated by an operator to input various operation signals to the controlling unit 26.

The displaying unit 25 is a display device such as a liquid crystal display disposed at the surface of the first terminal 2a, and displays the status of communication by the communicating unit 21 and the result of operation by the operating unit 24.

In this embodiment, the displaying unit 25 especially has the function of reading information on the digital contents from the holder unit 18 for display, based on an access level set according to a "session ID" identifying communication (session) established between the first IC card 1a and another IC card (e.g., the second IC card 1b) at that time, and a specified "session mode".

The controlling unit 26 is a CPU configured to control the operations of the units 21 to 25 in the first terminal 2a. In particular, the controlling unit 26 outputs, to the execution processing unit 15, a trigger signal to make it to start the execution process on a predetermined command, based on an operation signal from the operating unit 24.

Digital Contents

The first IC card 1a may be mounted with various applications storing the first digital contents, and thus the first digital contents may be of various types.

For example, the first digital contents may be as follows:
digital contents which cannot be altered by the owner of the first IC card 1*a* but can be altered only by an information issuer (e.g., a seat number of an electronic ticket);
digital contents which cannot be seen even by the owner of the first IC card 1*a* (e.g., key information for altering an electronic ticket);
digital contents which can be completely controlled only by the owner of the first IC card 1*a* (e.g., personal information of the owner of the first IC card 1*a*); and
digital contents which can be read by several people.

The first digital contents are issued by a trusted third party such as an issuing server, and are stored in the first IC card 1*a* together with the certificate data.

Certificate Data

The certificate data includes a "holder ID" identifying the first digital contents stored in the holder unit 18, "signature data" with which an issuer of the certificate data assures the authenticity of the certificate data, and a "public key (key information)" associated with the first digital contents.

The "holder ID" is identification data uniquely provided in a distributed system (distributed environment), and is used not only for physically identifying the first IC card 1*a* but also for routing control on the distributed system, and is also used as identification data toward the other party in authentication communication. That is, a "holder ID" is used for authentication of an IC card and a service client, message routing control and the like, on the network. In this embodiment, a "holder ID" is represented by 16 octets (128 bits).

Command

A predetermined command stored in the command storing unit 16 has atomicity to atomically perform a series of processes independently of operation at the second terminal 2*a* when the execution thereof is started in response to a predetermined trigger signal received from the first terminal 2*a*.

The series of processes by the predetermined command includes:

(1) a mutual authentication process;

(2) an encryption process;

(3) a transmission process or exchange process on digital contents;

(4) a transmission completion confirmation process or exchange completion confirmation process; and (5) a digital contents deletion process.

The predetermined command causes the execution processing unit 15 to store the "state of the units 12 to 19 (state of IC card)" in the first IC card 1*a*, prior to the digital contents transmission process (or exchange process).

The predetermined command deletes the first digital contents stored in the holder unit 18 when a "commit instruction" indicating the "completion of a reception process" is received from the second IC card 1*b* via the data transmitting/receiving unit 12, after completion of a transmission process on the first digital contents, Alternatively, the command may be configured to transmit a "transmission request" for the second digital contents to the second IC card 1*b* in response to the "commit instruction" received from the second IC card 1*b*, and, when a reception process on the second digital contents transmitted from the second IC card 1*b* in response to the "transmission request" is completed, to transmit a "transmission completion request" indicating this fact and to delete the first digital contents stored in the holder unit 18.

Also, if the communication is interrupted during execution of the transmission process on the first digital contents (or the exchange process on digital contents), the predetermined command reads the "state of the units 12 to 19 (state of IC card)" stored in the execution processing unit 15, and causes the units 12 to 19 in the first IC card 1*a* to return to the state (the read "state of the units 12 to 19 (state of IC card)") before the start of the digital contents transmission process (or exchange process), by a rollback process (return process).

Also, the predetermined command causes an execution processing unit 15 of the second IC card 1*b* to store the "state of units 12 to 19 (state of IC card)" in the second IC card 1*b* before the start of the digital contents transmission process (or exchange process), so as to cause the units 12 to 19 in the second IC card 1*b* to return to the "state of the units 12 to 19 (state of IC card)" stored in the execution processing unit 15 of the second IC card 1*b* if the transmission process (or the exchange process) on the digital contents is interrupted.

Data Communications Method in the Embodiment

With reference to the drawings, a data communications method according to this embodiment will be described. FIGS. 3 to 9 are flow diagrams illustrating the procedure of the data communications method in this embodiment. In this embodiment, the data communications method will be described with respect to both the transmission process on the first digital contents from the first IC card 1*a* to the second IC card 1*b*, and the exchange process on the first and second digital contents between the first IC card 1*a* and the second IC card 1*b*, based on an operation by an operator of the first IC card 1*a*.

(1) Overall Process

Figure 3:
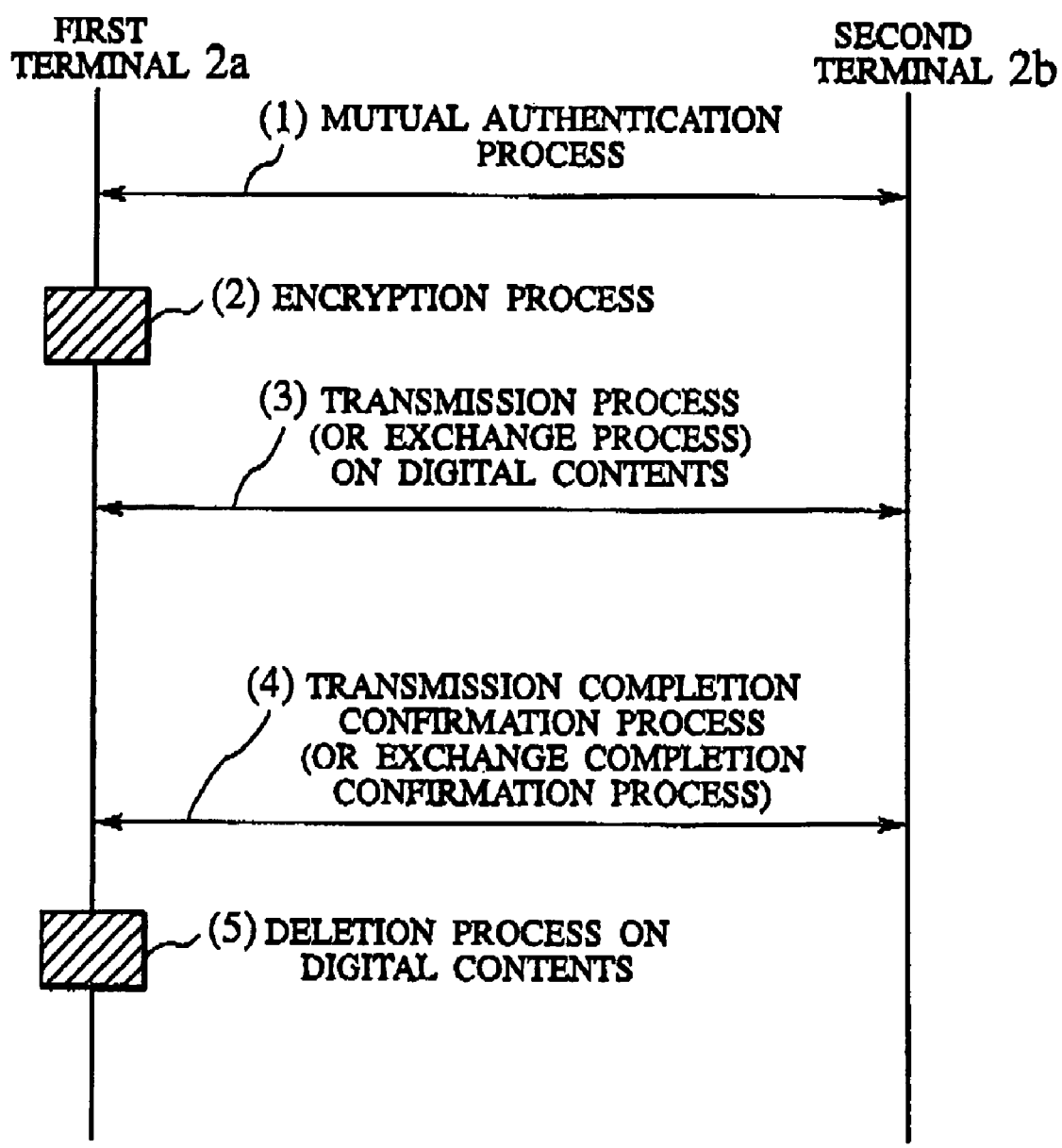
FIG. 3 is a sequence diagram illustrating the general operation of the data communications method according to the first embodiment of the present invention.

Referring to FIG. 3, the overall process of the data communications method according to this embodiment will be described.

As shown in FIG. 3, in step (1) of the data communications method in this embodiment, a mutual authentication process is performed between the first terminal 2*a* and the second terminal 2*b*. In step (2), after completion of the mutual authentication process, an encryption process is performed on the digital contents. In step (3), after completion of the encryption process, a transmission process (or exchange process) on the digital contents is performed. In step (4), the first and second terminals 2*a* and 2*b* perform a transmission completion confirmation process and an exchange completion confirmation process on the digital contents. In step (5), a deletion process on the digital contents is performed.

At that time, it is a prerequisite that the first digital contents have already been stored in the first IC card 1*a*.

Figure 4:
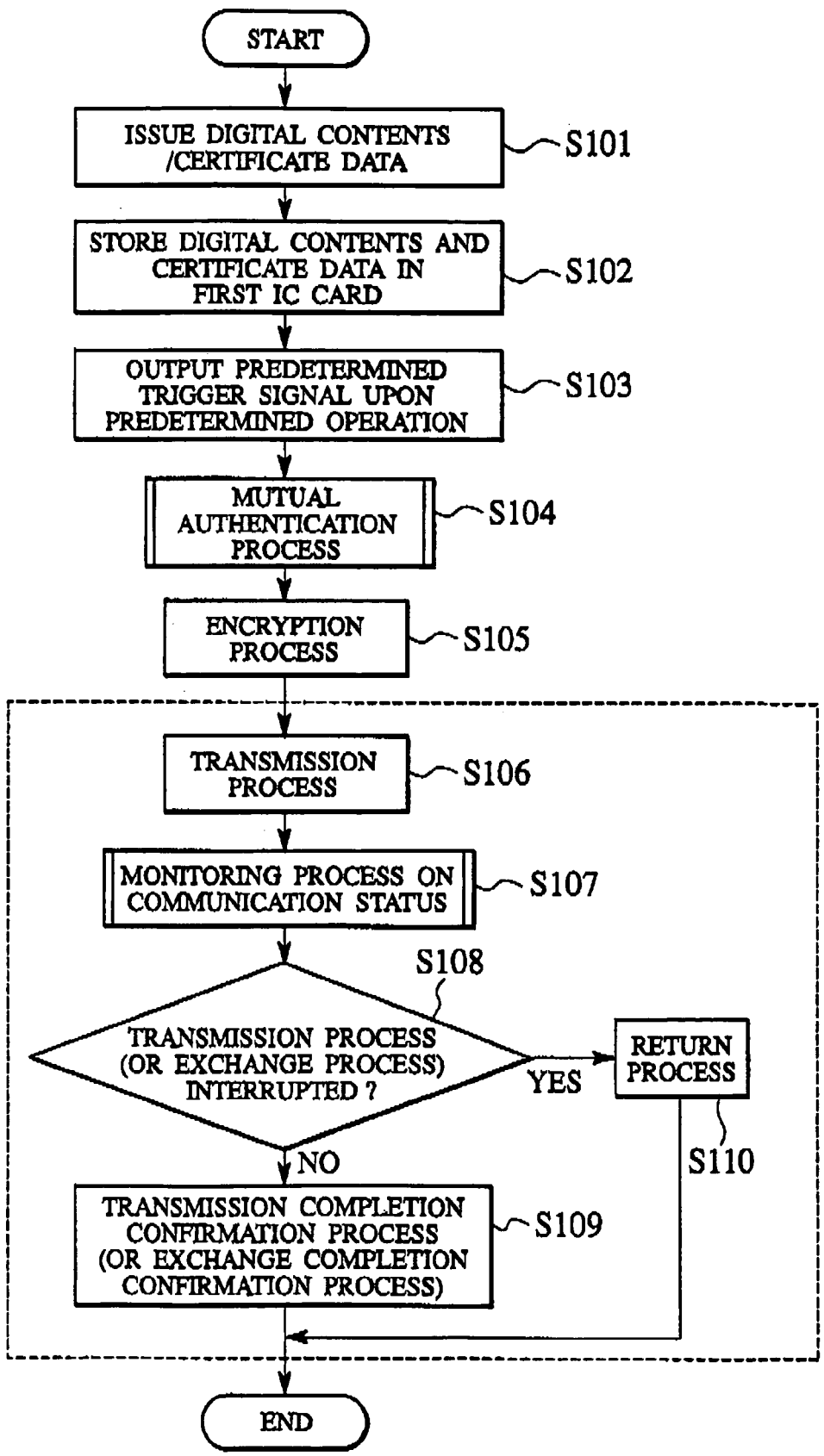
FIG. 4 is a flow chart illustrating the general operation of the data communications method according to the first embodiment of the present invention.

More specifically, as shown in FIG. 4, in step S101, an information issuer of the first digital contents issues the first digital contents and the certificate data.

For a transmission process on the first digital contents from the first IC card 1*a* to the second IC card 1*b*, in step S102, the information issuer of the first digital contents stores the first digital contents and the certificate data in the holder unit 18 and the certificate data storing unit 17 in the first IC card 1*a*, respectively.

For an exchange process on the first and second digital contents between the first IC card 1*a* and the second IC card 1*b*, in step S102, the information issuer of the first and second digital contents stores the first and second digital contents and the certificate data in the holders 18 and the certificate data storing units 17 in the first IC card 1*a* and the second IC card 1*b*, respectively.

The certificate data includes a "holder ID" identifying the first IC card 1a or the second IC card 1b in which the certificate data is stored, a "public key (key information)" associated with the first or second digital contents stored in the holder unit 18, and "signature data" for proving the authenticity of the first or second contents by the information issuer.

In step S103, the operator of the first terminal 2a starts an operation for performing the transmission process (or exchange process) on the digital contents. More specifically, the operator of the first terminal 2a operates the operating unit 24 of the first terminal 2a to start the transmission process (or exchange process) on the digital contents. According to the operation, the controlling unit 26 outputs a predetermined trigger signal to the first IC card 1a through the data transmitting/receiving units 23 and 12.

The execution processing unit 15 of the first IC card 1a reads a predetermined command from the command storing unit 16 according to the predetermined trigger signal, and executes the read predetermined command.

As a result, in step S104, the authenticating unit 13 performs a mutual authentication process with the second IC card 1b. In step S105, the encryption processing unit 14 of the first IC card 1a performs an encryption process on the first digital contents. In step S106, the communicating unit 21 of the first terminal 2a starts a transmission process on the first digital contents to the second IC card 1b (or the exchange process on the first and second digital contents).

In step S107, during the transmission process (or exchange process) on the digital contents, the communication monitoring unit 22 monitors the communication status between the first IC card 1a and the second IC card 1b, and in step S108, determines whether the transmission process (or exchange process) on the digital contents is interrupted or not.

When the transmission process (or exchange process) on the digital contents is not interrupted, that is, the transmission process (or exchange process) on the digital contents is normally completed, in step S109, a transmission completion confirmation process (or exchange completion confirmation process) is performed, and a deletion process is performed on the first digital contents in the holder(s) 18 of the first IC card 1a (and the second IC card 1b).

On the other hand, when the transmission process (or exchange process) on the digital contents is interrupted, that is, the transmission process (or exchange process) on the digital contents is not normally completed, in step 110, a return process is performed.

(2) Mutual Authentication Process

Figure 5:
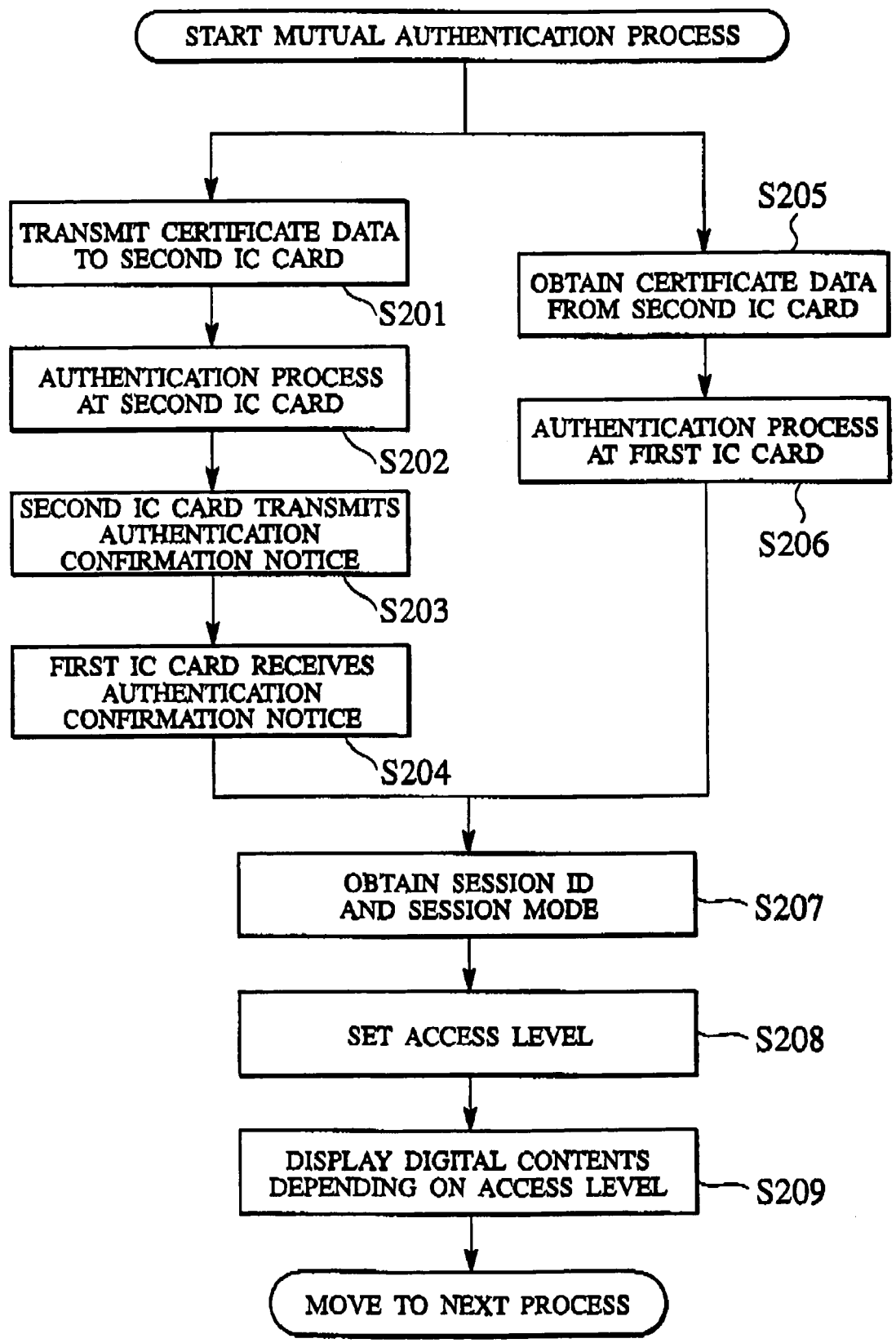
FIG. 5 is a flow chart illustrating a mutual authentication process in the data communications method according to the first embodiment of the present invention.

With reference to FIG. 5, the mutual authentication process in the above-described step S104 will be described in detail below. FIG. 5 is a flow diagram illustrating operations in the mutual authentication process in the data communications method according to this embodiment.

As shown in FIG. 5, when the first terminal 2a starts the mutual authentication process, in step S201, the authenticating unit 13 of the first IC card 1a transmits the certificate data stored in the certificate data storing unit 17 via the communicating unit 21 of the first terminal 2a to the second IC card 1b in the second terminal 2b.

In step 5202, the authenticating unit 13 of the second IC card 1b performs an authentication process on the first IC card 1a, based on the "signature data" and the "holder ID" contained in the received certificate data.

When the authenticity of the first IC card 1a is confirmed, in step S203, the authenticating unit 13 of the second IC card 1b transmits an "authentication confirmation notice" indicating this fact to the first IC card 1a. On the other hand, if the authenticity of the first IC card 1a is negated, the mutual authentication process is terminated.

In step S204, when the authenticating unit 13 of the first IC card 1a receives the "authentication confirmation notice" transmitted from the second IC card 1b, the authentication process at the second IC card 1b is finished.

In parallel with the above-described authentication process at the second IC card 1b, the same authentication process is also performed at the first IC card 1a.

Specifically, in step S205, the authenticating unit 13 of the first IC card 1a obtains certificate data from the second IC card 1b. In step S206, the authenticating unit 13 of the first IC card 1a performs an authentication process on the second IC card 1b, based on signature data and a "holder ID" contained in the obtained certificate data.

In step S207, the authenticating units 13 of the first IC card 1a and the second IC card 1b provide a "session ID" that is effective only in that session, and obtain a session mode from each other.

In step S208, the authenticating unit 13 of the first IC card 1a sets an access level to the digital contents, based on the obtained session mode and the card ID (holder ID) of the second IC card 1b.

Depending on the set access level, the security level of the digital contents in the holder unit 18 is determined, and details of the digital contents to be disclosed to the operator are restricted. Digital contents whose disclosure is not restricted can be read from the holder unit 18 and displayed at the displaying unit 25. The displayed digital contents may be the file name of the digital contents, the type of the digital contents (such as electronic money or coupon/ticket), or the like.

As described above, after completion of the mutual authentication process, the execution processing unit 15 of the first IC card 1a invokes a predetermined command stored in the command storing unit 16, and executes a transmission process (or exchange process) on the digital contents.

(3-1) Transmission Process

Figure 6:
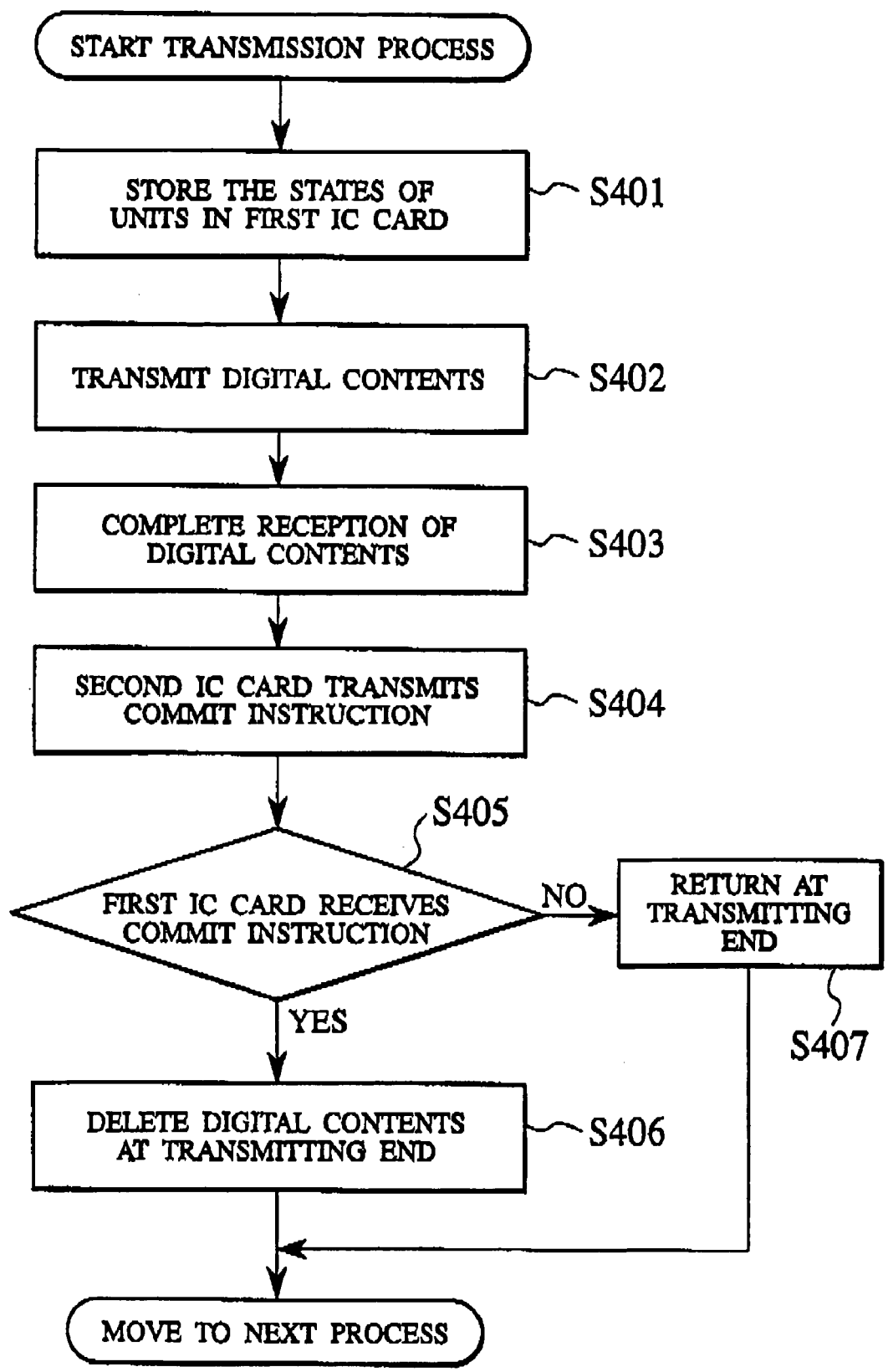
FIG. 6 is a flow chart illustrating a transmission process at a first IC card in the data communications method according to the first embodiment of the present invention.
Figure 7:
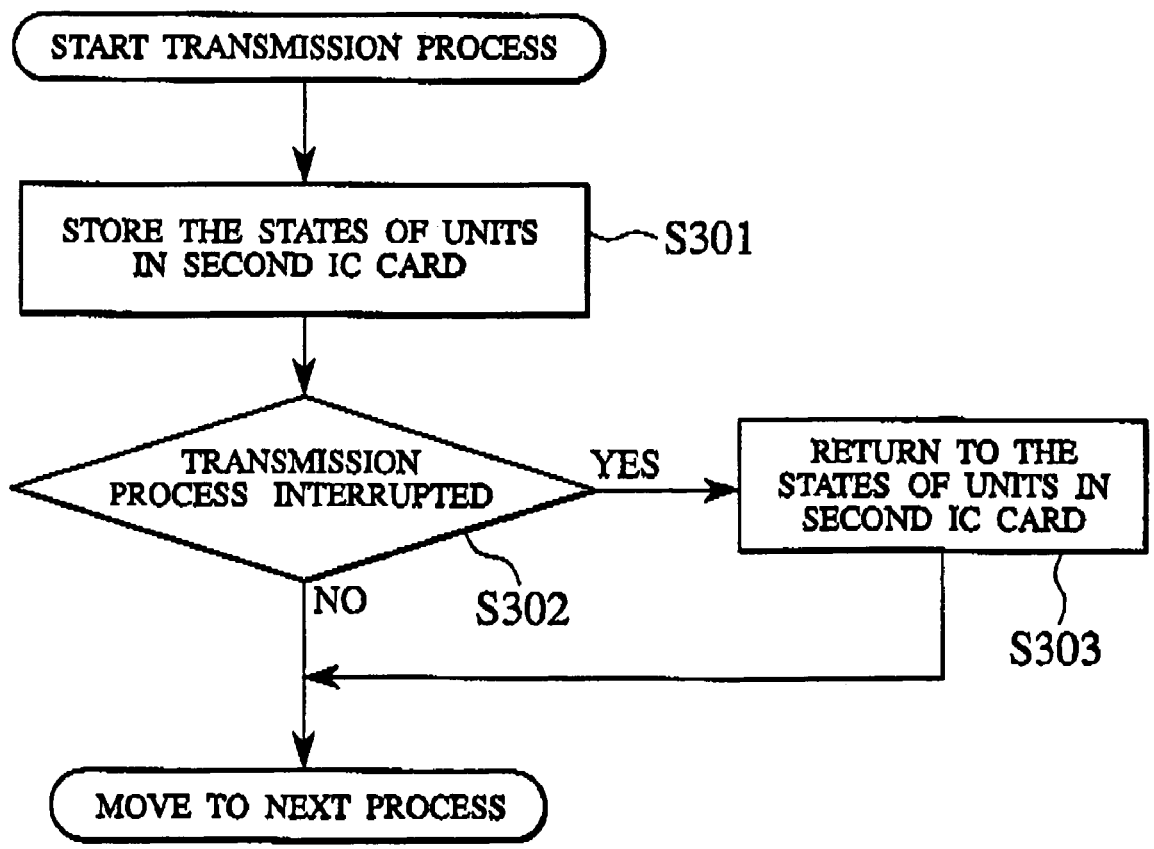
FIG. 7 is a flow chart illustrating a transmission process at a second IC card in the data communications method according to the first embodiment of the present invention.

With reference to FIGS. 6 and 7, the transmission process in the above-described step S106 will be described in detail below. FIG. 6 is a flow diagram illustrating operations in the transmission process at the first IC card 1a in the data communications method according to this embodiment. FIG. 7 is a flow diagram illustrating operations in the transmission process at the second IC card lab in the data communications method of this embodiment.

As shown in FIG. 6, when a transmission process on the first digital contents is started, in step S401, the execution processing unit of the first IC card 1a stores the state of the units 12 to 19 (state of IC card) at the start of the transmission process on the first digital contents. In step S402, the data transmitting/receiving unit 12 of the first IC card 1a transmits the encrypted first digital contents to the second IC card 1b.

In step S403, the data transmitting/receiving unit 12 of the second IC card 1b completes a reception process on the first digital contents. In step S404, the execution processing unit 15 of the second IC card 1b transmits to the first IC card 1a a "commit instruction" indicating normal completion of the reception process on the first digital contents.

When the data transmitting/receiving unit 12 of the first IC card 1a receives the commit instruction in step 5405, the execution processing unit 15 of the first IC card 1*a* deletes the first digital contents from the holder unit 18 in step S406.

On the other hand, if the data transmitting/receiving unit 12 of the first IC card 1*a* does not receive the commit instruction in step S405, in step S407, the execution processing unit 15 of the first IC card 1*a* does not perform the deletion process on the first digital contents, and causes the units 12 to 19 to return to the stored state of the units 12 to 19 (state of IC card) at the start of the transmission process.

As shown in FIG. 7, when a transmission process on the first digital contents is started, in step S301, the execution processing unit 15 of the second IC card 1*b* stores the state of the units 12 to 19 (state of IC card) at the start of the transmission process. Thereafter, when the second IC card 1*b* starts a reception process on the first digital contents, the second IC card 1*b* accumulates the received first digital contents.

In step S302, when the transmission process on the first digital contents is finished without interruption, the second IC card 1*b* stores the received first digital contents, and the transmission process is finished.

On the other hand, when an interruption of the transmission process on the first digital contents occurs in step S302, in step S303, the execution processing unit 15 of the second IC card 1*b* causes the units 12 to 19 to return to the stored state of the units 12 to 19 (state of IC card) at the start of the transmission process. At that time, the received first digital contents are deleted.

(3-2) Exchange Process

Figure 8:
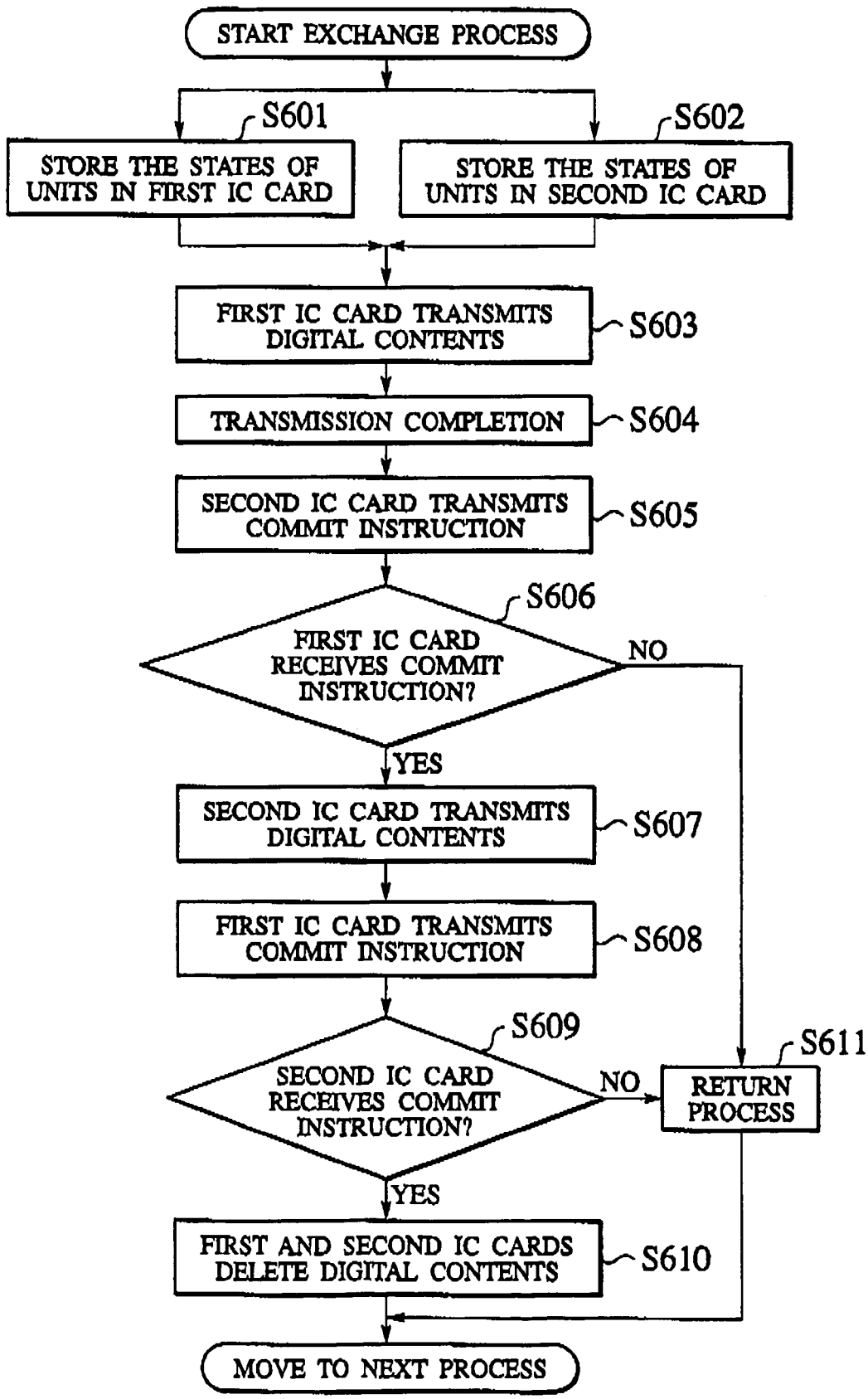
FIG. 8 is a flow chart illustrating an exchange process in the data communications method according to the first embodiment of the present invention.

With reference to FIG. 8, the exchange process in the above-described step S106 will be described in detail below. FIG. 8 is a flow diagram illustrating operations in the exchange process in the data communications method of this embodiment.

As shown in FIG. 8, when the exchange process is started, in steps S601 and S602, the execution processing units 15 of the first IC card 1*a* and the second IC card 1*b* store the state of the units 12 to 19 (state of IC card) at the start of the exchange process.

In step S603, the data transmitting/receiving unit 12 of the first IC card 1*a* transmits the encrypted first digital contents to the second IC card 1*b* via the communicating unit 21 of the first terminal 2*a*.

In step S604, the data transmitting/receiving unit 12 of the second IC card 1*b* completes a reception process on the first digital contents. In step S605, the execution processing unit 15 of the second IC card 1*b* transmits to the first IC card 1*a* a "commit instruction" indicating normal completion of the reception process on the first digital contents.

In step S606, when the data transmitting/receiving unit 12 of the first IC card 1*a* receives the commit instruction, the execution processing unit 15 of the first IC card 1*a* transmits a "transmission request" for the second digital contents to the second IC card 1*b*. In step S307, in response to the transmission request, the data transmitting/receiving unit 12 of the second IC card 1*b* transmits the second digital contents to the first IC card 1*a*.

When completing a reception process on the second digital contents, in step S608, the data transmitting/receiving unit 12 of the first IC card 1*a* transmits a "commit instruction" indicating this fact to the second IC card 1*b*.

When the data transmitting/receiving unit 12 of the second IC card 1*b* receives the commit instruction in step S609, that is, when the exchange process on the digital contents is normally finished without interruption, in step S610, the execution processing units 15 of the first IC card 1*a* and the second IC card 1*b* delete the first digital contents from the holders 18.

On the other hand, when not receiving the above-described commit instruction in step S606, in step S610, the execution processing unit 15 of the first IC card 1*a* causes the units 12 to 19 to return to the stored state of the units 12 to 19 (state of IC card) at the start of the exchange process, without deleting the first digital contents on which the transmission process to the second IC card 1*b* has been completed.

In this case, the execution processing unit 15 of the second IC card 1*b* deletes the first digital contents transmitted from the first IC card 1*a* and temporarily held, and also causes the units 12 to 19 to return to the stored state of the units 12 to 19 (state of IC card) at the start of the exchange process.

Also, when the execution processing unit 15 of the second IC card 1*a* does not receive the above-described commit instruction in step S609, in step S611, the execution processing unit 15 of the first IC card 1*a* deletes the second digital contents transmitted from the second IC card 1*b* and temporarily held. Also, the execution processing unit 15 of the first IC card 1*a* causes the units 12 to 19 to return to the stored state of the units 12 to 19 (state of IC card) at the start of the exchange process, without deleting the first digital contents on which the transmission process to the second IC card 1*b* has been completed.

In this case, the execution processing unit 15 of the second IC card 1*a* causes the units 12 to 19 to return to the stored state of the units 12 to 19 (state of IC card) at the start of the exchange process, without deleting the second digital contents whose transmission to the first IC card 1*a* has been completed. Also, the execution processing unit 15 of the second IC card 1*a* deletes the first digital contents transmitted from the first IC card 1*a* and temporarily held.

(4) Monitoring Process

Figure 9:
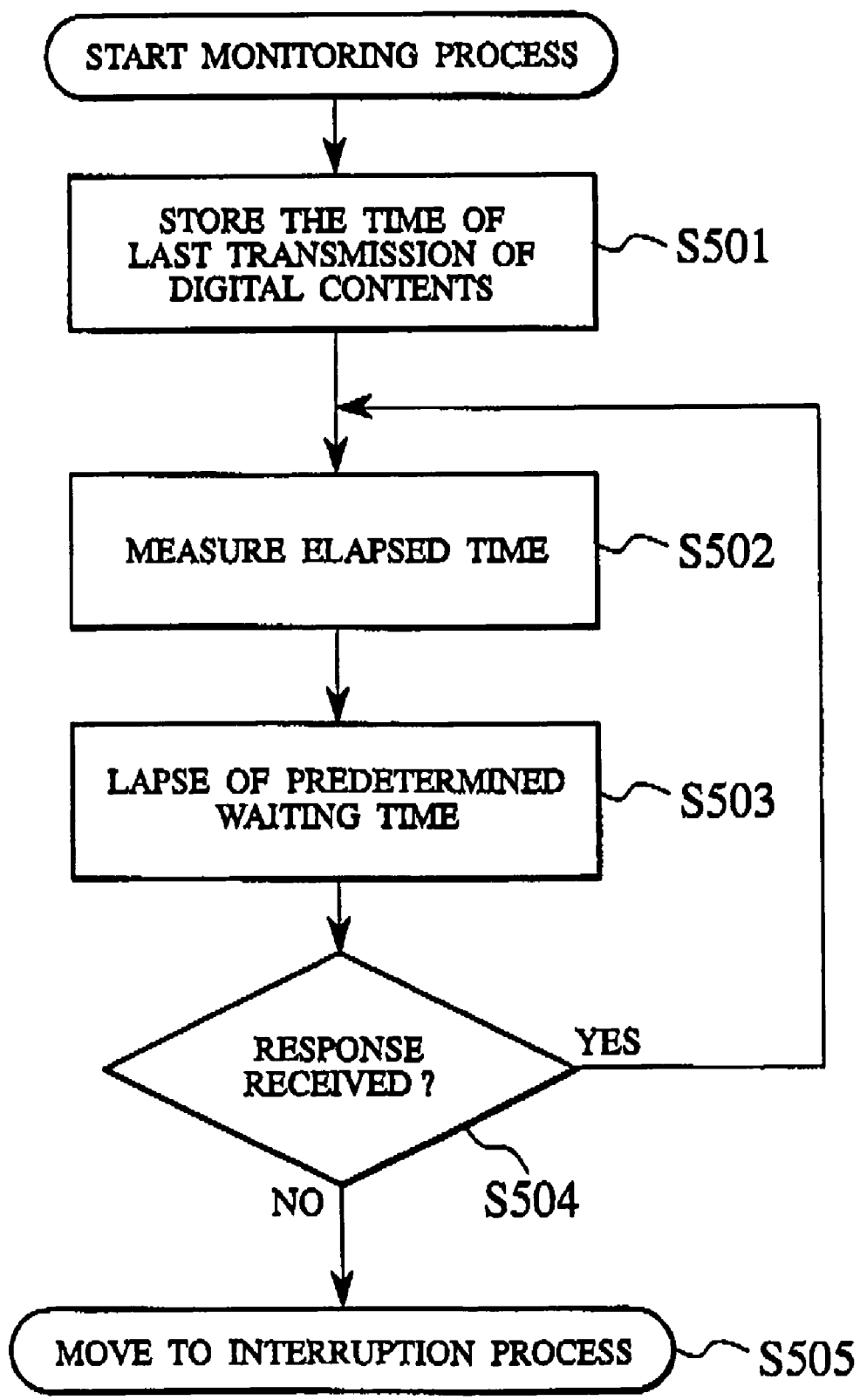
FIG. 9 is a flow chart illustrating a monitoring process on the communication status in the data communications method according to the first embodiment of the present invention.

With reference to FIG. 9, the monitoring process on the communication status in the above-described step S107 will be described in detail below. FIG. 9 is a flow diagram illustrating operations in the monitoring process in the data communications method of this embodiment.

As shown in FIG. 9, the data transmitting/receiving unit 12 of the first IC card 1*a* transmits the encrypted first digital contents to the second IC card 1*b*. In step S501, the execution processing unit 15 of the first IC card 1*a* measures the time of transmission of the digital contents, and stores the time when the digital contents were transmitted last.

Instep S502, the execution processing unit 15 of the first IC card 1*a* measures the elapsed time since the time when digital contents were transmitted last, and in steps S503 and S504, determines whether there is some response from the second IC card 1*b* or not during the lapse of waiting time of a predetermined length.

When there is a response from the second IC card 1*b* in step S504, in step S502, the execution processing unit 15 of the first IC card 1*a* continuously measures the elapsed time.

On the other hand, when it is determined that there is no response from the second IC card 1*b* in step S504, in step S505, the execution processing unit 15 of the first IC card 1*a* performs a termination process on the monitoring process. The termination process may be the above-described return process (e.g., step S110 shown in FIG. 4).

Second Embodiment

Basic Configuration

Now, a second embodiment of the present invention will be described. This embodiment is characterized in that a data communications method according to the first embodiment of the present invention is applied to electronic transactions such as distribution of electronic tickets and electronic coupons.

Figure 10:
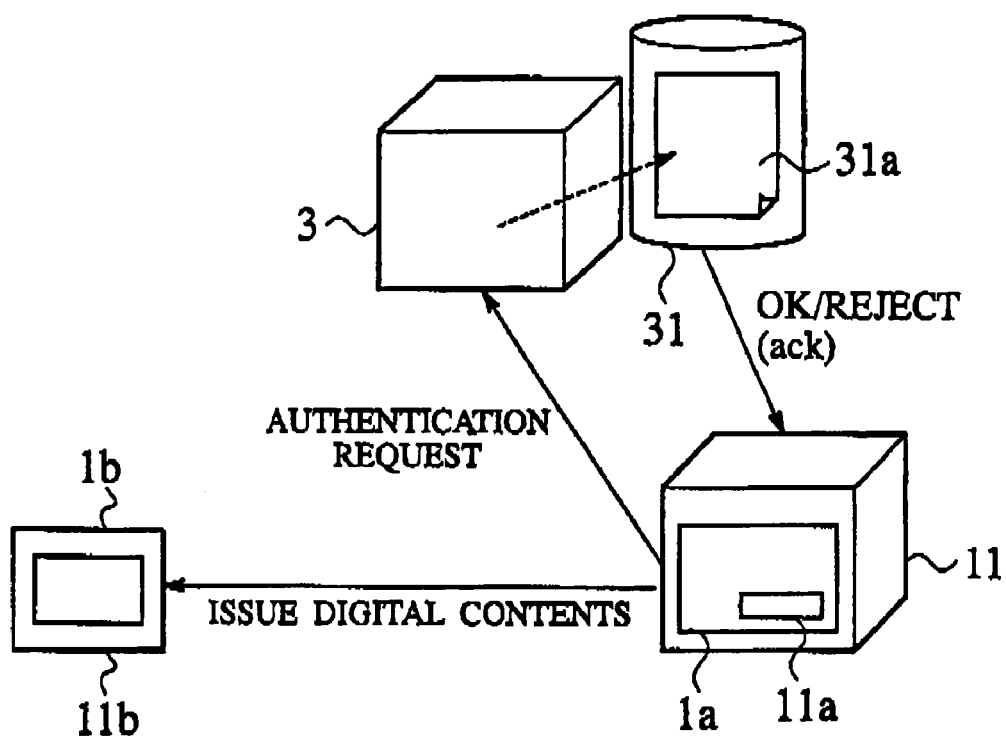
FIG. 10 is a schematic block diagram of a digital contents issuing system according to a second embodiment of the present invention.

Specifically, as shown in FIG. 10, in a data communications method of this embodiment, a first IC card 1a in the above-described first embodiment is loaded for use in a contents issuing server 11 which issues digital contents such as electronic tickets.

In the data communications method in this embodiment, digital contents issued by the contents issuing server 11 are transmitted from the contents issuing server 11 to a second IC card 1b. The second IC card 1b pays electronic money for the digital contents transmitted from the contents issuing server 11.

Figure 11:
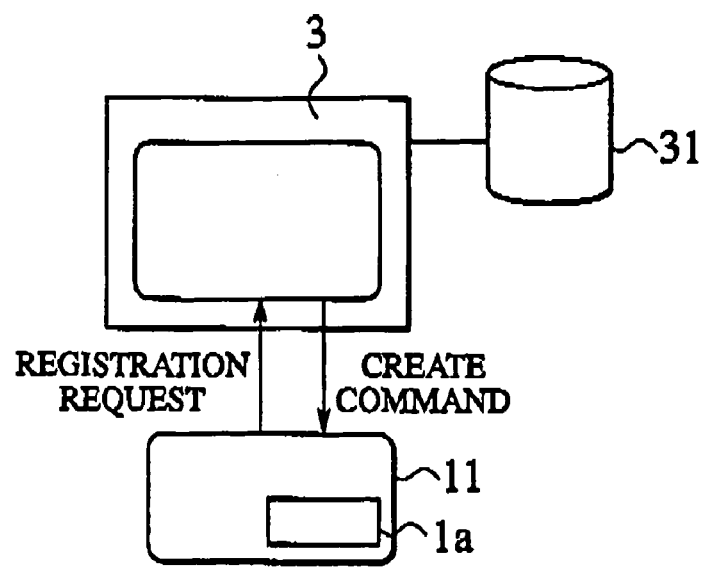
FIG. 11 is a schematic block diagram of the digital contents issuing system according to the second embodiment of the present invention.

FIGS. 10 to 12 are explanatory diagrams schematically illustrating the configuration of a digital contents issuing system adopting the data communications method in the second embodiment.

As shown in FIG. 10, the digital contents issuing system includes the contents issuing server 11 configured to issue digital contents to the second IC card 1b, and a command generating server 3 configured to generate and manage a "create command (predetermined command)" if and a "create right (creating right)" used for the issuance of the digital contents.

The issuance of digital contents is done by exchanging digital contents created at the contents issuing server 11 for electronic money stored in the second IC card 1b.

More specifically, the issuance of digital contents is done in such a manner that digital contents (such as an electronic ticket) temporarily stored in the first IC card la loaded in the contents issuing server 11 are transferred to the second IC card 1b, and digital contents (electronic money) temporarily stored in the second IC card 1b are transferred to the contents issuing server 11.

At that time, a create command obtained from the command generating server 3 is executed, whereby the digital contents are exchanged between the contents issuing server 11 and the second IC card 1b. To execute the create command, a create right issued at the command generating server 3 is required.

The contents issuing server 11 is a server which has an interface in which the first IC card 1a temporarily storing digital contents is loaded, and executes a create command, thereby providing the service of transferring the digital contents into the second IC card 1b.

As shown in FIG. 11, a create command is an execution program issued to the contents issuing server 11 whose registration is admitted by the command generating server 3 when the contents issuing server 11 transmits a "registration request" to the command generating server 3.

As shown in FIG. 12, every time the first IC card 1a executes a create command, an "authentication request" is transmitted to the command generating server 3, and it is checked whether a create right corresponding to the create command exists or not, that is, whether the create right has been issued or not (authentication).

The create command operates only if a create right corresponding to the create command has been issued, and if the create right has not been issued, rejects operation.

In this embodiment, as shown in FIG. 12, the contents issuing server 11 can check the result of authentication by the command generating server 3 with an "ack (ok/reject)" transmitted from the command generating server 3.

More specifically, the contents issuing server 11 executes a create command, thereby transmitting a command generation request (the above-described authentication request) to the command generating server 3, and can create digital contents when obtaining an ack (ok) from the command generating server 3 in response to the command generation request.

Prior to the creation of digital contents, the contents issuing server 11 is required to perform a registration process toward the command generating server 3 to obtain a create command. Through the registration process, the command generating server 3 issues a create right to the create command. The issued create right is managed in a registered server database 31.

When creating digital contents, the contents issuing server 11 is required to perform an authentication process with the command generating server 3 to obtain a create right. In this authentication process, the contents issuing server 11 transmits to the command generating server 3 a contents creation request (authentication request), personal information (server information) and signature data of the contents issuing server 11 itself.

The command generating server 3 generates (issues) and transmits a create command to the contents issuing server 11, and also issues and manages a create right corresponding to the issued create command. For management of the create right, a registered server list 31a stored in the registered server database 31 is used.

When receiving the "registration request", "personal information (server information)" and "signature data" from the contents issuing server 11, the command generating server 3 authenticates the contents issuing server 3, based on the received "personal information (server information)". When determining that the contents issuing server 11 is eligible to create digital contents, the command generating server 3 registers the "personal information (server information)" of the contents issuing server 11 in the registered server list 31a, and issues a create command for transmission to the contents issuing server 11.

Also, when receiving the contents creation request (authentication request) from the contents issuing server 11, the command generating server 3 performs checking (authentication) with the registered server list 31a in response to the contents creation request, and returns an ack (ok) to the contents issuing server only if the authentication result is positive.

Operation

The data communications method (method of issuing digital contents) according to this embodiment will be described. FIG. 13 is a sequence diagram illustrating the method of issuing digital contents according to this embodiment.

As shown in FIG. 13, in step S1101, the contents issuing server 11 transmits to the command generating server 3 the "personal information (server information)" and the "signature data" together with a "registration request".

In step S1102, the command generating server 3 authenticates the contents issuing server 11, based on the received "personal information (server information)". When determining that the contents issuing server 11 is eligible to create digital contents, the command generating server 3 registers the "personal information (server information)" of the contents issuing server 11 in the registered server list 31a, and in step S1103, transmits a create command to the contents issuing server 11.

When the first IC card 1a loaded in the contents issuing server 11 executes the create command in step S1104, in step S1105, the create command transmits a "contents creation request (authentication request)", the "personal information (server information)" and the "signature data of the contents issuing server 11 itself" to the command generating server 3.

In step S1106, the command generating server 3 checks with the registered server list 31a whether a create right corresponding to the create command exists or not.

In step S1107, the command generating server 3 transmits the authentication result as an "ack (ok/reject)" to the contents issuing server 11.

When the content of the ack transmitted from the command generating server 3 is "ok", in step S1108, the contents issuing server 11 creates digital contents (e.g., an electronic ticket or the like).

On the other hand, when the content of the ack transmitted from the command generating server 3 is "reject", in step S1109, the contents issuing server 11 does not create digital contents (e.g., an electronic ticket or the like), and performs create command execution error process.

Modification 1

Figure 14:
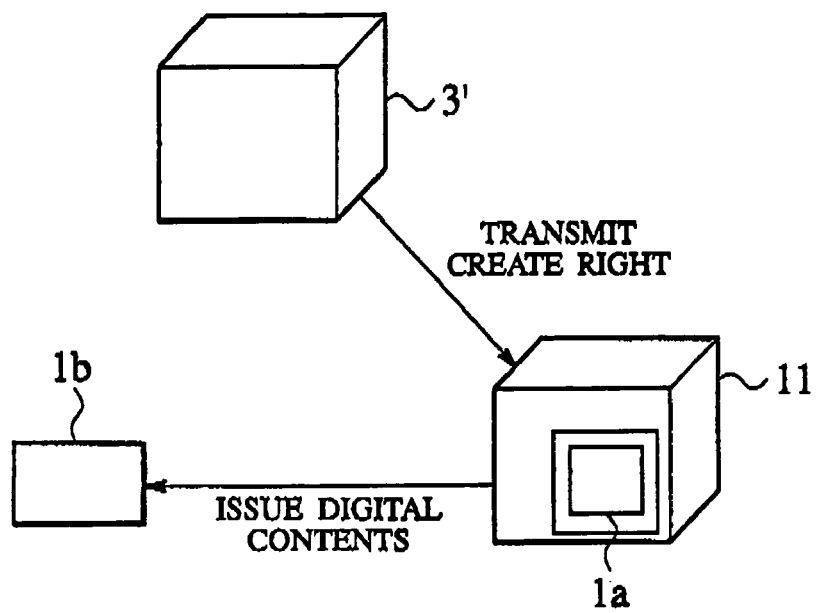
FIG. 14 is a schematic block diagram of a digital contents issuing system according to modification 1 of the present invention;.
Figure 15:
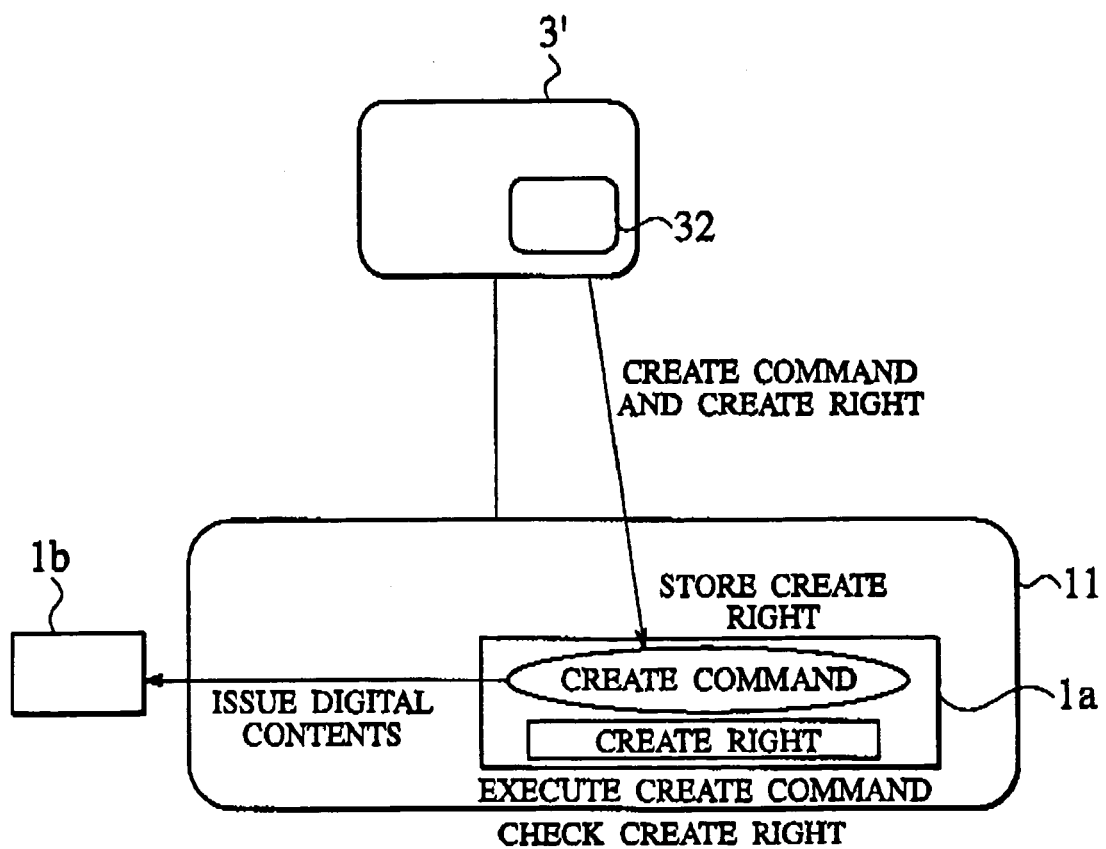
FIG. 15 is a schematic block diagram of the digital contents issuing system according to a modification 1 of the present invention.

To the above-described second embodiment, a modification as described below may be made. FIGS. 14 and 15 are block diagrams illustrating the configuration of a digital contents issuing system according to a modification 1. In this modification, together with a create command, a create right is issued to a contents issuing server 11.

As shown in FIGS. 14 and 15, the digital contents issuing system in this modification includes the contents issuing server 11 configured to issue digital contents to a first IC card 1a, and a command generating server 3' configured to generate and manage a create command and a create right used for the issuance of digital contents.

The command generating server 3' in this modification includes an issue right managing unit 32 configured to manage a create command and a create right in association.

The contents issuing server 11 stores a create command and a create right received from the command generating server 3' in the first IC card 1a.

Every time the create command is executed by the first IC card 1a, it is checked whether the create right stored in association with the create command exists or not in the first IC card 1a. When the create right exists, digital contents are issued, and when the create right does not exist, create command execution error process is performed.

Figure 16:
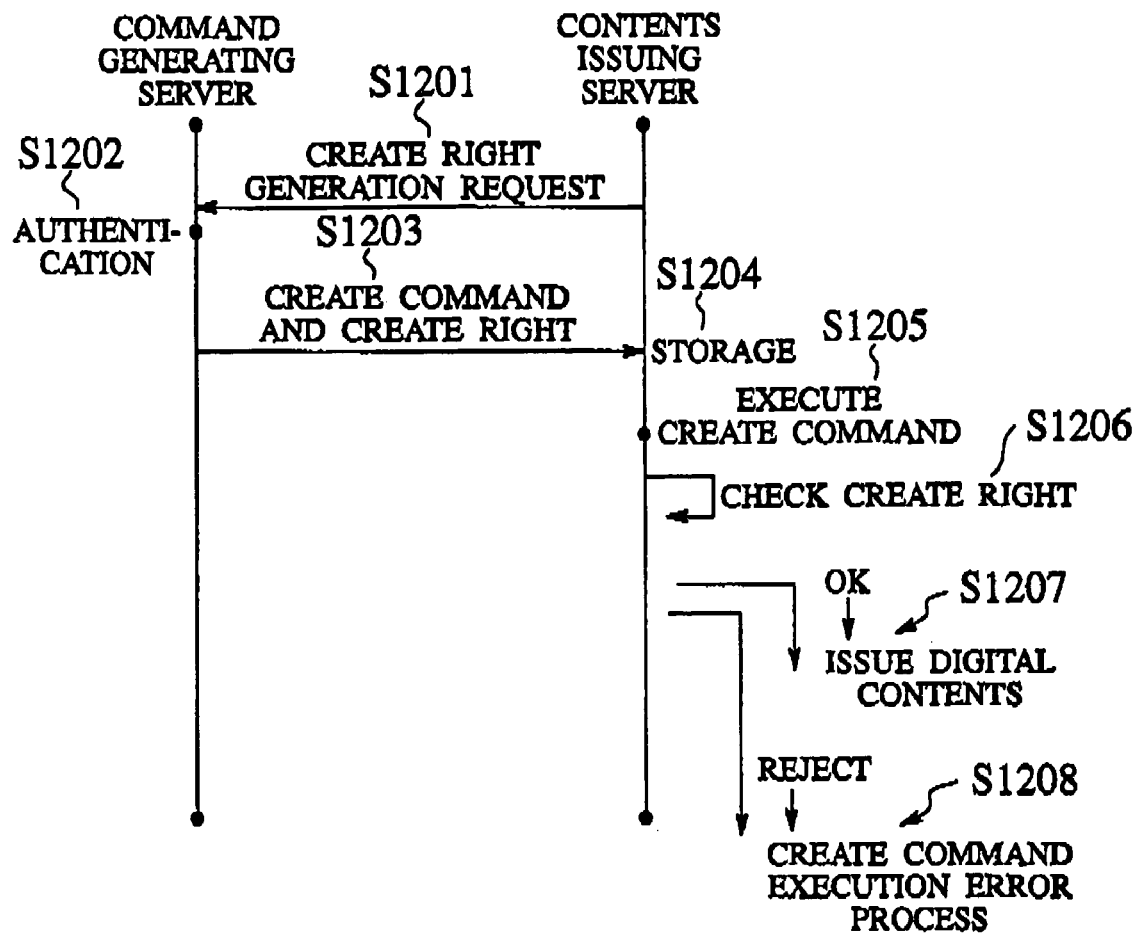
FIG. 16 is a sequence diagram illustrating the operation of the digital contents issuing system according to the modification 1 of the present invention.

A data communications method (method of issuing digital contents) according to this modification will be described. FIG. 16 is a sequence diagram illustrating the method of issuing digital contents according to this modification.

In step S1201, the contents issuing server 11 transmits a "create right generation request" and "personal information (server information)" to the command generating server 3'.

In step S1202, upon reception of the "create right generation request", the command generating server 3' checks the received "personal information", so as to check whether the contents issuing server 11 is eligible to create digital contents or not. When determining its eligibility to create digital contents, in step S1203, the command generating server 3' transmits a create right and a create command to the contents issuing server 11.

In step S1204, the create right and the create command transmitted from the command generating server 3' are directly stored in the first IC card 1a in the contents issuing server 11.

In step S1205, the contents issuing server 11 executes the create command when issuing digital contents.

In step S1206, the create command checks whether the create right exists or-not in the first IC card 1a.

When the create right exists in the first IC card 1a, in step S1207, the contents issuing server 11 issues digital contents, using the create command. When the create right does not exist in the first IC card 1a, in step 51208, the contents issuing server 11 performs create command execution error process.

Modification 2

Figure 17:
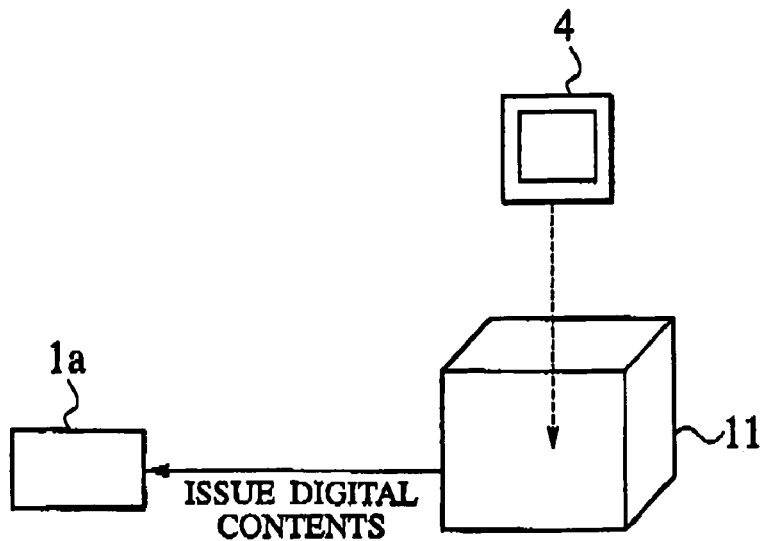
FIG. 17 is a schematic block diagram of a digital contents issuing system according to a modification 2 of the present invention.
Figure 18:
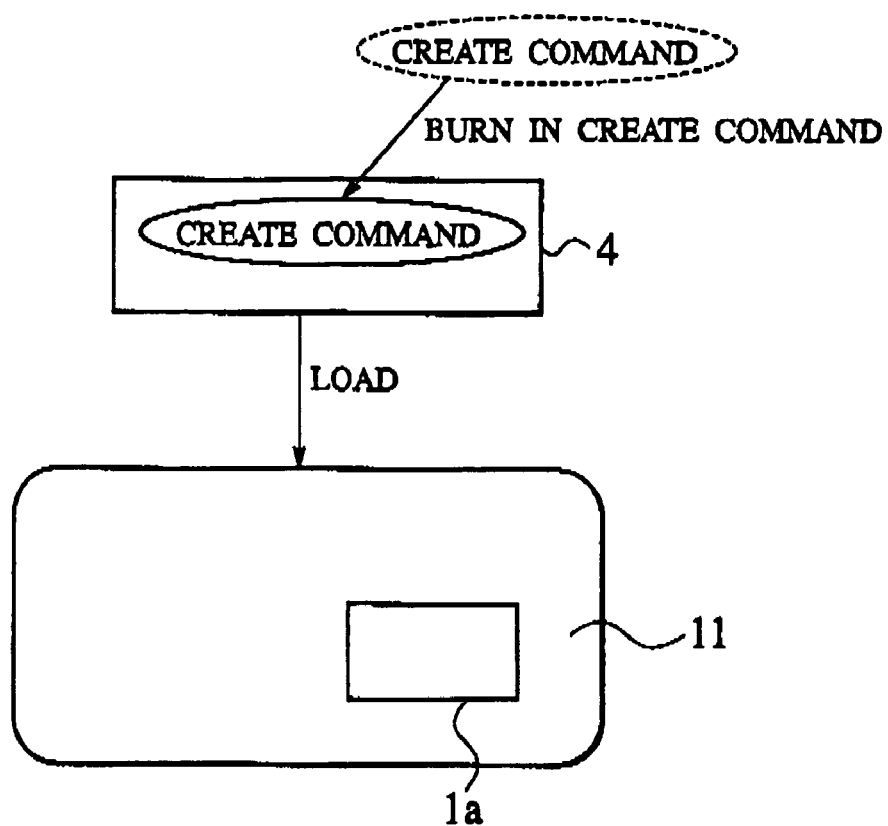
FIG. 18 is a schematic block diagram of the digital contents issuing system according to the modification 2 of the present invention.

With reference to FIGS. 17 and 18, a modification 2 of the second embodiment will be described. FIGS. 17 and 18 are block diagrams illustrating the configuration of a digital contents issuing system according to this modification. In this modification, the authentication on a contents issuing server 11 is not done by software but is done physically.

As shown in FIGS. 17 and 18, the digital contents issuing system in this modification includes the contents issuing server 11 configured to issue digital contents to a first IC card 1a.

An IC card (IC chip) 4 into which a create command has originally been burned is connected to the contents issuing server 11. When issuing digital contents, the contents issuing server 11 accesses the IC card 4, thereby invoking the create command for execution.

The create command is physically fixed to the IC card 4, thereby, it is prevented from alteration from outside. To change the digital contents issuing system, the IC chip 4 is physically changed to change the contents issuing server 11.

Modification 3

Figure 19:
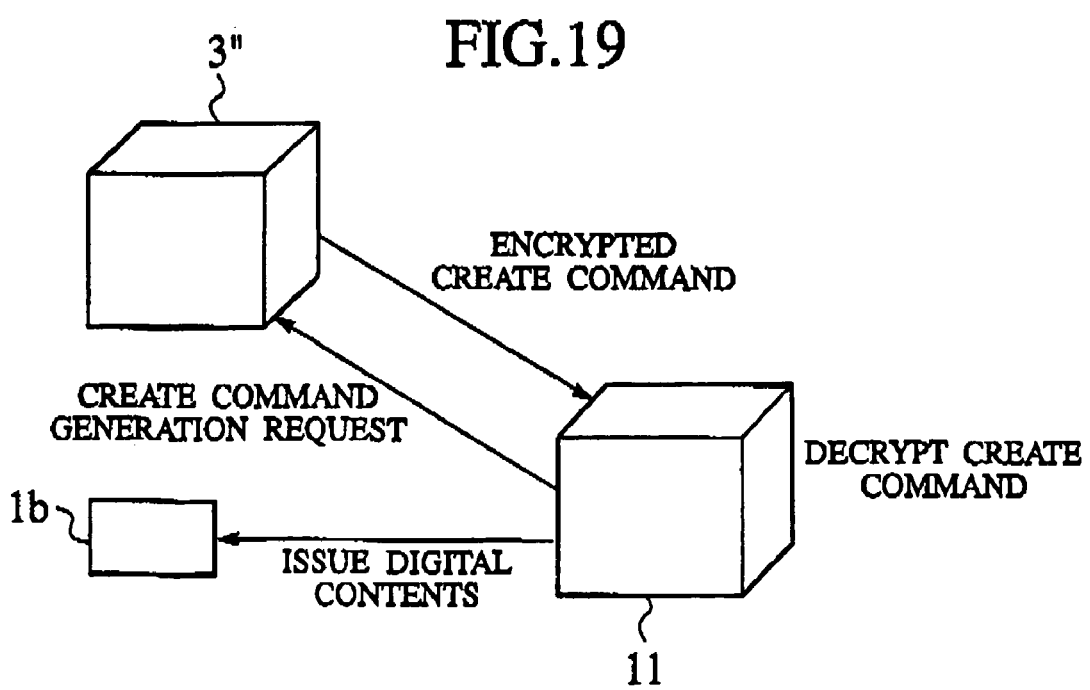
FIG. 19 is a schematic block diagram of a digital contents issuing system according to a modification 3 of the present invention.
Figure 20:
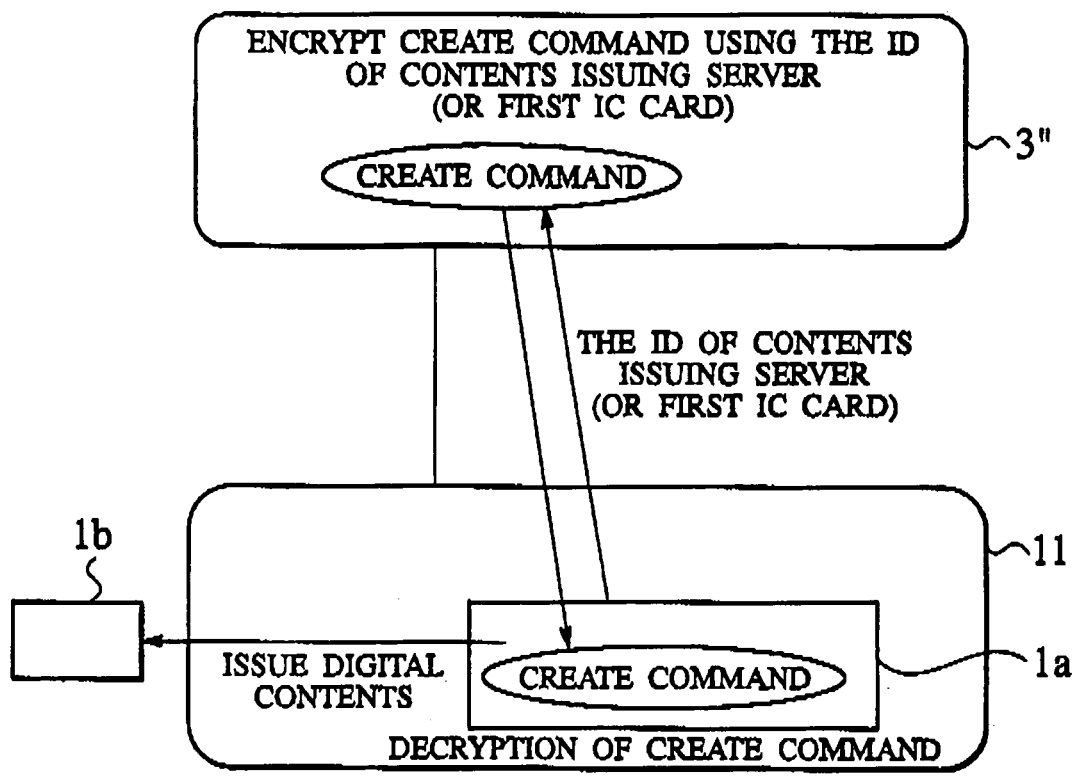
FIG. 20 is a schematic block diagram of the digital contents issuing system according to the modification 3 of the present invention.

Now, with reference to FIGS. 19 to 21, a modification 3 of the second embodiment will be described. FIGS. 19 and 20 are block diagrams illustrating the configuration of a digital contents issuing system according to this modification.

As shown in FIGS. 19 and 20, the digital contents issuing system in this modification includes a contents issuing server 11 configured to issue digital contents to a first IC card 1a, and a command generating server 3" configured to generate a create command that is used for issuing digital contents.

The command generating server 3" in this modification has the function of encrypting a create command, using an ID of an authenticated contents issuing server 11 (or the first IC card 1a) and transmitting it to the contents issuing server 11.

Figure 21:
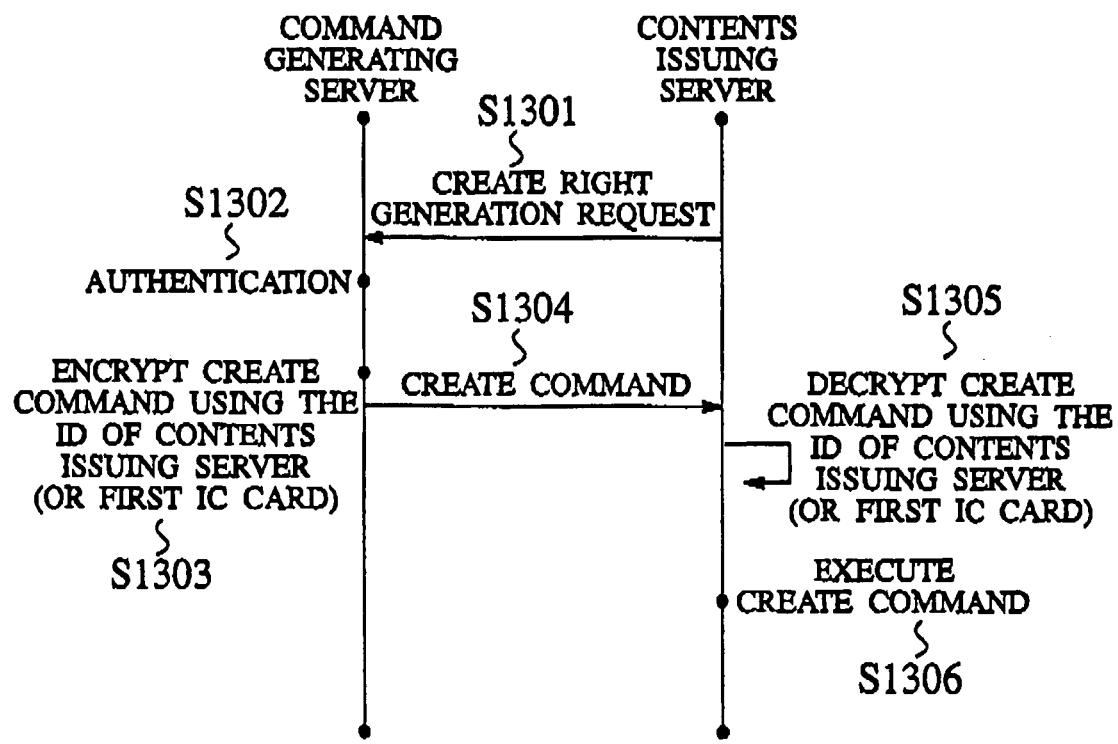
FIG. 21 is a sequence diagram illustrating the operation of the digital contents issuing system according to the modification 3 of the present invention.

With reference to FIG. 21, a data communications method (method of issuing digital contents) according to this modification will be described. FIG. 21 is a sequence diagram illustrating the method of issuing digital contents according to this modification.

As shown in FIG. 21, in step S13-1, the contents issuing server 11 transmits "personal information (including the ID of the contents issuing server 11 or the first IC card 1a)" together with a "create command generation request" to the command generating server 3".

In step S1302, in response to the "create command generation request", the command generating server 3" authenticates the contents issuing server 11, based on the received "Personal information". Thereafter, when determining that the contents issuing server 11 is eligible to create digital contents, in step S1303, the command generating server 3" encrypts a create command, using the ID of the contents issuing server 11 (or the first IC card 1a).

In step S1304, the command generating server 3" transmits the encrypted create command to the contents issuing server 11.

The contents issuing server 11 receives the encrypted create command, and directly stores it in the first IC card 1a. The first IC card 1a extracts the ID of the contents issuing server 11 from the personal information of the contents issuing server 11.

In step S1305, the first IC card 1a decrypts the stored create command, using the extracted ID of the contents issuing server 11 (or the ID of the first IC card 1a).

In step S1306, the first IC card 1a executes the decrypted create command, and issues digital contents. As a result, a create command can be issued only to an authenticated contents issuing server 11.

INDUSTRIAL APPLICABILITY

As described above, according to the present invention, a digital contents encryption process, transmission process and exchange process are performed, using an atomic command provided in an IC card, without using a command of an external terminal or server, so that any effect by fraudulent manipulation from an external terminal or server can be avoided, and a safe digital contents transmission process (or exchange process) can be performed independently of the secure environment of an external terminal or server.

As a result, when digital contents are transmitted (or exchanged) on a communication platform where direct communication is performed between IC cards, they are able to be prevented from being duplicated or lost by a transmitter/receiver and a malicious third party.

The invention claimed is:

1. An IC card, comprising:
a holder configured to store first digital contents;
a certificate data storage configured to store certificate data including key information associated with the first digital contents;
an encryption processor; and
an execution processor, the execution processor being configured to execute a predetermined command when receiving a predetermined trigger signal,
wherein the predetermined command executed by the execution processor causes the execution processor to create the first digital contents when a create right of the first digital contents is acknowledged; store a state of the IC card before transmission of the first digital contents; causes the encryption processor to perform an encryption process on the first digital contents, based on the key information associated with the first digital contents; deletes the first digital contents from the holder when a commit instruction indicating completion of a reception process on the encrypted first digital contents is received from a destination device; and performs a return process to the state of the IC card stored in the execution processor when a transmission process on the first digital contents is interrupted.

2. The IC card as set forth in claim 1, wherein the predetermined command executed by the execution processor transmits a transmission request for second digital contents to the destination device when the commit instruction is received, and deletes the first digital contents from the holder when a reception process on the second digital contents is completed.

3. The IC card as set forth in claim 1, further comprising:
an authenticator configured to obtain certificate data of the destination device from the destination device, and to authenticate the destination device based on the certificate data, prior to transmission of the first digital contents;
wherein the execution processor is configured to execute the predetermined command when the destination device is authenticated.

4. The IC card as set forth in claim 3, wherein the authenticator is configured to set an access level to the first digital contents stored in the holder, according to a session ID identifying a session with the destination device and a session mode.

5. The IC card as set forth in claim 3, wherein:
the authenticator is configured to transmit the certificate data stored in the certificate data storage to the destination device, and to obtain from the destination device an authentication confirmation notice indicating that the certificate data has been authenticated, prior to transmission of the first digital contents; and
the execution processor is configured to execute the predetermined command when the authentication confirmation notice is obtained.

6. A terminal which transmits first digital contents stored in an IC card to a destination device, comprising:
a controller configured to output a predetermined trigger signal to the IC card, based on an input operation signal;
an execution processor of the IC card is configured to execute a predetermined command in response to the predetermined trigger signal; and
the first digital contents are created when a create right of the first digital contents is acknowledged; the predetermined command executed by the execution processor causes the execution processor to store a state of the IC card before transmission of the first digital contents; causes an encryption processor of the IC card to perform an encryption process on the first digital contents, based on key information associated with the first digital contents; deletes the first digital contents from a holder of the IC card when a commit instruction indicating completion of a reception process on the encrypted first digital contents is received from the destination device; and performs a return process to the state of the IC card stored in the execution processor when a transmission process on the first digital contents is interrupted.

7. The terminal as set forth in claim 6, wherein the predetermined command executed by the execution processor transmits a transmission request for second digital contents to the destination device when the commit instruction is received, and deletes the first digital contents from the holder when a reception process on the second digital contents is completed.

8. The terminal as set forth in claim 6, further comprising a communication monitor configured to inform the IC card of an interruption of the transmission process on the first digital contents when there is no response from the destination device during a lapse of a predetermined waiting time after transmission of the first digital contents from the IC card to the destination device.

9. The terminal as set forth in claim 6, further comprising a display configured to read information on the first digital contents from the holder for display, based on an access level set according to a session ID identifying a session established between the IC card and the destination device and a session mode.

10. A data communications method of transmitting first digital contents stored in an IC card to a destination device, comprising the steps of:
- executing a predetermined command when the IC card receives a predetermined trigger signal;
- creating the first digital contents when a create right of the first digital contents is acknowledged;
- storing a state of the IC card before transmission of the first digital contents;
- performing an encryption process on the first digital contents based on key information associated with the first digital contents;
- deleting the first digital contents from a holder of the IC card when a commit instruction indicating completion of a reception process on the encrypted first digital contents is received from the destination device; and
- performing a return process to the stored state of the IC card when a transmission process on the first digital contents is interrupted.

11. The data communications method as set forth in claim 10, further comprising the steps of:
- transmitting a transmission request for second digital contents to the destination device when the commit instruction is received; and
- deleting the first digital contents from the holder when a reception process on the second digital contents is completed.

12. The data communications method as set forth in claim 10, further comprising the step of, at a terminal loaded with the IC card, outputting the predetermined trigger signal to the IC card, based on an input operation signal.

* * * * *